United States Patent
Knox

(10) Patent No.: US 10,678,882 B2
(45) Date of Patent: Jun. 9, 2020

(54) SYSTEMS AND METHODS FOR PROVIDING A USER INTERFACE WITH GRID VIEW

(71) Applicant: EBAY INC., San Jose, CA (US)

(72) Inventor: Derek Knox, Lehi, UT (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/370,773

(22) Filed: Mar. 29, 2019

(65) Prior Publication Data
US 2019/0278824 A1    Sep. 12, 2019

Related U.S. Application Data

(63) Continuation of application No. 15/821,038, filed on Nov. 22, 2017, now Pat. No. 10,296,553, which is a continuation of application No. 14/573,923, filed on Dec. 17, 2014, now Pat. No. 9,842,173, which is a continuation of application No. 13/408,137, filed on Feb. 29, 2012, now Pat. No. 8,935,606.

(51) Int. Cl.
| | |
|---|---|
| *G06F 16/00* | (2019.01) |
| *G06F 16/957* | (2019.01) |
| *G06Q 30/00* | (2012.01) |
| *G06F 40/14* | (2020.01) |

(52) U.S. Cl.
CPC .......... *G06F 16/9577* (2019.01); *G06F 40/14* (2020.01); *G06Q 30/016* (2013.01)

(58) Field of Classification Search
CPC ............ G06F 17/2247; G06F 16/9577; G06Q 30/016
See application file for complete search history.

(56) References Cited

U.S. PATENT DOCUMENTS

| | | |
|---|---|---|
| 5,619,631 A | 4/1997 | Schott |
| 5,751,576 A | 5/1998 | Monson |
| 5,844,572 A | 12/1998 | Schott |
| 5,848,425 A | 12/1998 | Lowry et al. |
| 6,088,708 A | 7/2000 | Burch et al. |
| 6,330,976 B1 | 12/2001 | Dymetman et al. |
| 6,791,571 B1 * | 9/2004 | Lamb ................ G06F 17/211 345/619 |
| 7,158,878 B2 | 1/2007 | Rasmussen et al. |
| 7,164,410 B2 * | 1/2007 | Kupka ................ G06F 3/0231 345/156 |
| 7,350,142 B2 | 3/2008 | Kraft et al. |
| 7,366,978 B1 * | 4/2008 | Jones ................ G06F 16/9577 715/227 |
| 7,672,906 B2 | 3/2010 | Schwartz et al. |
| 7,797,226 B2 | 9/2010 | Ram et al. |
| 7,797,621 B1 | 9/2010 | Danner et al. |

(Continued)

OTHER PUBLICATIONS

Wylie, John, "Export CSS Painlessly from Website Comps in Fireworks", published Oct. 22, 2007, pp. 1-8 (Year: 2007).*

(Continued)

*Primary Examiner* — Laurie A Ries
(74) *Attorney, Agent, or Firm* — Holland & Hart LLP

(57) ABSTRACT

A tool (systems, apparatus, methodology, application, user interface, etc.) for accessing content, such as webpages hosted over a network such as the internet, and more particularly, a tool for accessing the content of a webpage and further displaying a grid view superimposed over the content of the webpage.

20 Claims, 24 Drawing Sheets

(56) References Cited

U.S. PATENT DOCUMENTS

| | | | |
|---|---|---|---|
| 8,020,083 B1* | 9/2011 | Kembel | G06F 3/0484 |
| | | | 715/201 |
| 8,145,545 B2 | 3/2012 | Rathod et al. | |
| 8,386,916 B2 | 2/2013 | Le Brazidec et al. | |
| 8,392,841 B1* | 3/2013 | Bowden | G06F 16/9577 |
| | | | 715/760 |
| 8,584,034 B2 | 11/2013 | Holt et al. | |
| 8,756,502 B2* | 6/2014 | Hill | G06F 3/0481 |
| | | | 715/702 |
| 8,935,606 B2 | 1/2015 | Knox | |
| 9,842,173 B2 | 12/2017 | Knox | |
| 9,921,716 B2* | 3/2018 | Hill | G06F 3/0481 |
| 10,296,553 B2 | 5/2019 | Knox | |
| 2002/0175944 A1* | 11/2002 | Kolde | H04N 5/4403 |
| | | | 715/773 |
| 2003/0004704 A1 | 1/2003 | Baron | |
| 2004/0017403 A1 | 1/2004 | Andersson et al. | |
| 2005/0270311 A1 | 12/2005 | Rasmussen et al. | |
| 2005/0273695 A1* | 12/2005 | Schnurr | H04W 24/00 |
| | | | 715/213 |
| 2006/0132836 A1* | 6/2006 | Coyne | G06F 3/1205 |
| | | | 358/1.15 |
| 2006/0149465 A1 | 7/2006 | Park et al. | |
| 2006/0277460 A1 | 12/2006 | Forstall et al. | |
| 2008/0048932 A1 | 2/2008 | Yanagisawa | |
| 2008/0209480 A1* | 8/2008 | Eide | G11B 27/105 |
| | | | 725/87 |
| 2008/0294679 A1 | 11/2008 | Gatterbauer et al. | |
| 2008/0301542 A1 | 12/2008 | McGee et al. | |
| 2009/0119329 A1 | 5/2009 | Kwon et al. | |
| 2009/0210781 A1 | 8/2009 | Hagerott et al. | |
| 2009/0213079 A1 | 8/2009 | Segal et al. | |
| 2009/0258857 A1* | 10/2009 | Reiser | C07D 513/04 |
| | | | 514/212.08 |
| 2010/0083129 A1 | 4/2010 | Mishra et al. | |
| 2010/0257468 A1 | 10/2010 | Bernardo et al. | |
| 2011/0004830 A1 | 1/2011 | Von Kaenel et al. | |
| 2011/0035661 A1* | 2/2011 | Balinsky | G06F 17/21 |
| | | | 715/243 |
| 2011/0126087 A1 | 5/2011 | Aust | |
| 2011/0252299 A1 | 10/2011 | Lloyd et al. | |
| 2011/0307491 A1* | 12/2011 | Fisk | G06F 16/4393 |
| | | | 707/741 |
| 2011/0320603 A1 | 12/2011 | Turski et al. | |
| 2012/0036455 A1* | 2/2012 | Holt | G06F 3/0482 |
| | | | 715/753 |
| 2012/0036456 A1 | 2/2012 | Grunberger | |
| 2012/0079366 A1 | 3/2012 | Cohen | |
| 2012/0089914 A1 | 4/2012 | Holt et al. | |
| 2012/0117452 A1 | 5/2012 | Lloyd et al. | |
| 2012/0124052 A1 | 5/2012 | Furey et al. | |
| 2012/0159356 A1 | 6/2012 | Steelberg | |
| 2013/0019195 A1 | 1/2013 | Gates | |
| 2013/0061124 A1 | 3/2013 | Patton et al. | |
| 2013/0100056 A1 | 4/2013 | Taylor et al. | |
| 2013/0125032 A1 | 5/2013 | Lettau | |
| 2013/0155323 A1* | 6/2013 | Segal | H04N 5/445 |
| | | | 348/563 |
| 2013/0159925 A1 | 6/2013 | Leffert et al. | |
| 2013/0227389 A1 | 8/2013 | Knox | |
| 2013/0268840 A1 | 10/2013 | Skirpa | |
| 2014/0289651 A1* | 9/2014 | Jude | G06F 8/34 |
| | | | 715/762 |
| 2015/0106694 A1 | 4/2015 | Knox | |
| 2018/0081985 A1 | 3/2018 | Knox | |

OTHER PUBLICATIONS

Amendment Under 37 CFR 1.312 filed Mar. 29, 2019, for U.S. Appl. No. 15/821,038, dated Mar. 29, 2019, 10 pages.
First Action Interview—OA Summary received for U.S. Appl. No. 15/821,038, dated Nov. 20, 2018, 7 pages.
First Action Interview—Pre Interview Communication received for U.S. Appl. No. 15/821,038, dated Nov. 1, 2018, 6 pages.
Notice of Allowance received for U.S. Appl. No. 15/821,038, dated Feb. 15, 2019, 11 pages.
Preliminary Amendment filed for U.S. Appl. No. 15/821,038, dated Nov. 28, 2017, 7 pages.
PTO Response to Rule 312 Communication received for U.S. Appl. No. 15/821,038, dated Apr. 11, 2019, 2 pages.
Response to First Action Interview—Office Action Summary filed Jan. 15, 2019, for U.S. Appl. No. 15/821,038, dated Nov. 20, 2018, 28 pages.
Response to First Action Interview—Pre-Interview Communication filed Nov. 7, 2018, for U.S. Appl. No. 15/821,038, dated Nov. 1, 2018, 14 pages.
Supplemental Preliminary Amendments filed for U.S. Appl. No. 15/821,038, dated Dec. 21, 2017, 8 pages.
Non-Final Office Action received for U.S. Appl. No. 13/408,137, dated Mar. 7, 2014, 11 pages.
Non-Final Office Action received for U.S. Appl. No. 13/408,137, dated Sep. 25, 2013, 13 pages.
Notice of Allowance received for U.S. Appl. No. 13/408,137, dated Sep. 12, 2014, 10 pages.
Response to Non-Final Office Action filed Aug. 7, 2014, for U.S. Appl. No. 13/408,137, dated Mar. 7, 2014, 8 pages.
Response to Non-Final Office Action filed Jan. 27, 2014, for U.S. Appl. No. 13/408,137, dated Sep. 25, 2013, 10 pages.
Non-Final Office Action received for U.S. Appl. No. 14/573,923, dated Mar. 23, 2017, 16 pages.
Notice of Allowance received for U.S. Appl. No. 14/573,923, dated Aug. 8, 2017, 9 pages.
Preliminary Amendment for U.S. Appl. No. 14/573,923, filed Mar. 16, 2015, 6 pages.
Response to Non-Final Office Action filed Jun. 23, 2017, for U.S. Appl. No. 14/573,923, dated Mar. 23, 2017, 9 pages.

* cited by examiner

| GRID | A | B | C | D | E | F | G |
|---|---|---|---|---|---|---|---|
| 1 | A1 | B1 | C1 | D1 | E1 | F1 | G1 |
| 2 | A2 | B2 | C2 | D2 | E2 | F2 | G2 |
| 3 | A3 | B3 | C3 | D3 | E3 | F3 | G3 |
| 4 | A4 | B4 | C4 | D4 | E4 | F4 | G4 |
| 5 | A5 | B5 | C5 | D5 | E5 | F5 | G5 |
| 6 | A6 | B6 | C6 | D6 | E6 | F6 | G6 |
| 7 | A7 | B7 | C7 | D7 | E7 | F7 | G7 |
| 8 | A8 | B8 | C8 | D8 | E8 | F8 | G8 |
| 9 | A9 | B9 | C9 | D9 | E9 | F9 | G9 |
| 10 | A10 | B10 | C10 | D10 | E10 | F10 | G10 |
| 11 | A11 | B11 | C11 | D11 | E11 | F11 | G11 |

Please select spacing/distance between lines:

| Horizontal Axis | Vertical Axis |
|---|---|
| ◯ ½ Spacing | ◯ ½ Spacing |
| ◉ Normal Spacing | ◉ Normal Spacing |
| ◯ Double Spacing | ◯ Double Spacing |

Drill-down mode?

◯ On
◉ Off

*Fig. 12*

| | 1 | 2 | 3 | 4 | 5 | 6 |
|---|---|---|---|---|---|---|
| A | | | | | | |
| B | | | | | | |
| C | | | | | | |
| D | | | | | | |
| GRID | | | | | | |

Fig. 13a

| GRID | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|------|---|---|---|---|---|---|---|---|---|----|----|----|----|----|----|----|----|----|----|----|----|----|
| A | | | | | | | | | | | | | | | | | | | | | | |
| B | | | | | | | | | | | | | | | | | | | | | | |
| C | | | | | | | | | | | | | | | | | | | | | | |
| D | | | | | | | | | | | | | | | | | | | | | | |
| E | | | | | | | | | | | | | | | | | | | | | | |
| F | | | | | | | | | | | | | | | | | | | | | | |
| G | | | | | | | | | | | | | | | | | | | | | | |

SYSTEMS AND METHODS FOR PROVIDING A USER INTERFACE WITH GRID VIEW

CLAIM OF PRIORITY

This application is a continuation of U.S. patent application Ser. No. 15/821,038, filed Nov. 22, 2017, which is a continuation of U.S. patent application Ser. No. 14/573,923, filed Dec. 17, 2014, now U.S. Pat. No. 9,842,173, issued Dec. 12, 2017, which is a continuation of U.S. patent application Ser. No. 13/408,137, filed on Feb. 29, 2012, now U.S. Pat. No. 8,935,606, issued Jan. 13, 2015, each of which are hereby incorporated by reference in their entirety.

TECHNICAL FIELD

This patent document pertains generally to data communications and more specifically to systems and methods for providing a user interface with a grid view.

BACKGROUND

Conventionally, when a user desires to access the content of a webpage of an enterprise or other organization, the user typically utilizes a web browser of a computer terminal, mobile device or similar apparatus to connect to a network (e.g., the Internet) and access the relevant webpage.

Often, the user may have questions regarding the features available on the webpage, and/or how to navigate the content of the webpage. For example, the user may have a specific question regarding whether a particular feature is available on the webpage and, if so, where that feature can be found on the webpage. In such a situation, the user typically contacts a customer service representative of the organization (typically via telephone) and speaks to the customer service representative, who can attempt to answer the user's questions and direct them to the appropriate features that are available on the webpage. Since the discussion between the user and the customer service representative typically takes place over the phone, the customer service representative must usually describe orally to the user where on the webpage the appropriate features may be found.

BRIEF DESCRIPTION OF DRAWINGS

Some embodiments are illustrated by way of example and not limitation in the figures of the accompanying drawings in which:

FIGS. 9a-9d illustrate example portions of various user interface screens displayed on a display of a client terminal via a browser application, wherein a grid is overlaid over the content of a webpage, according to an example embodiment.

FIG. 11 illustrates an example portion of a user interface screen of a browser, displayed on a display of a client terminal via a browser application, wherein a grid is overlaid over the content of a webpage, according to an example embodiment.

FIG. 12 illustrates an example portion of a user interface screen of a browser, displayed on a display of a client terminal via a browser application, wherein a user selects a line distance factor and/or toggles a drill-down mode, according to an example embodiment.

Figure 13A:
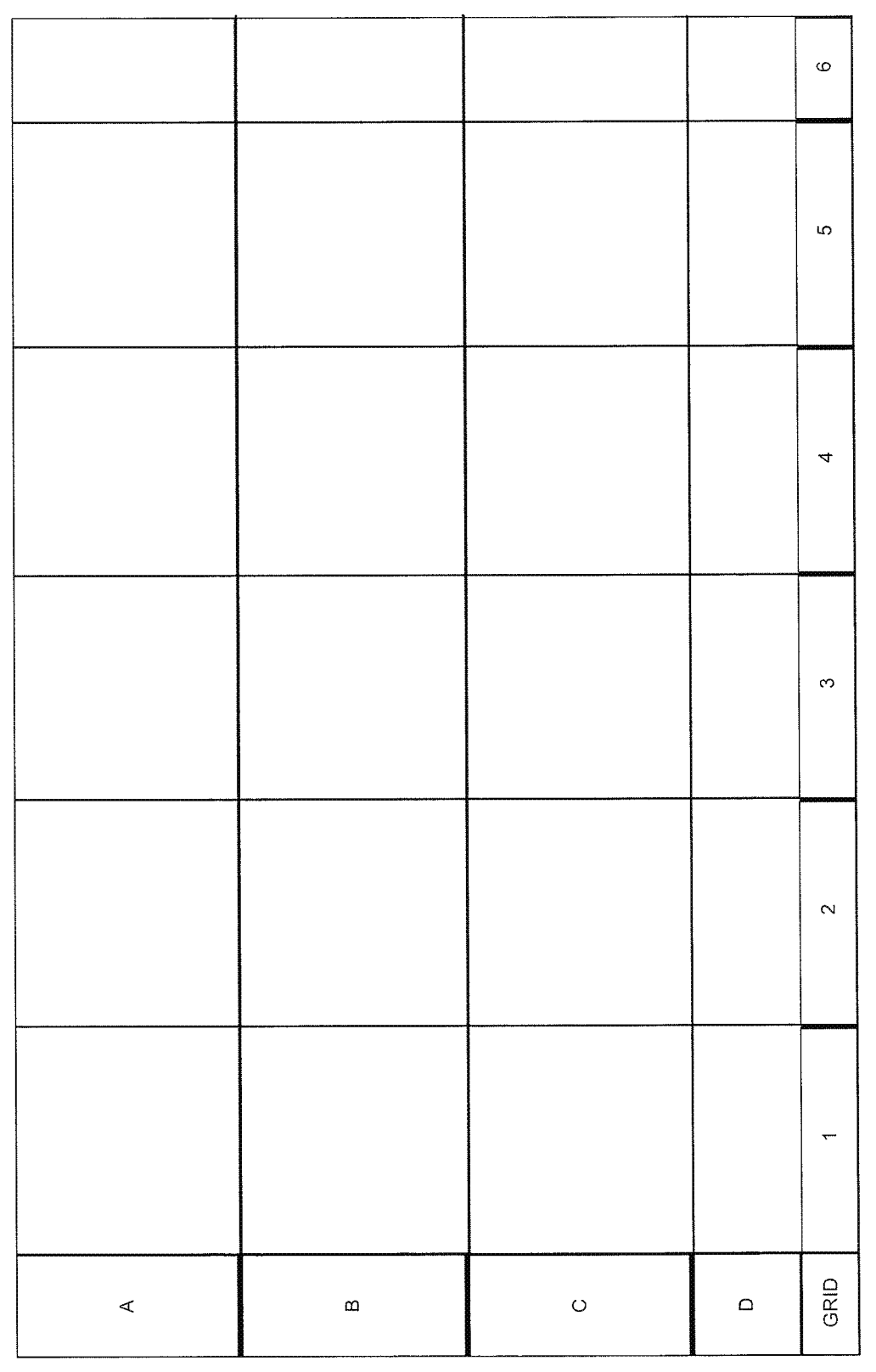
Figure 13C:
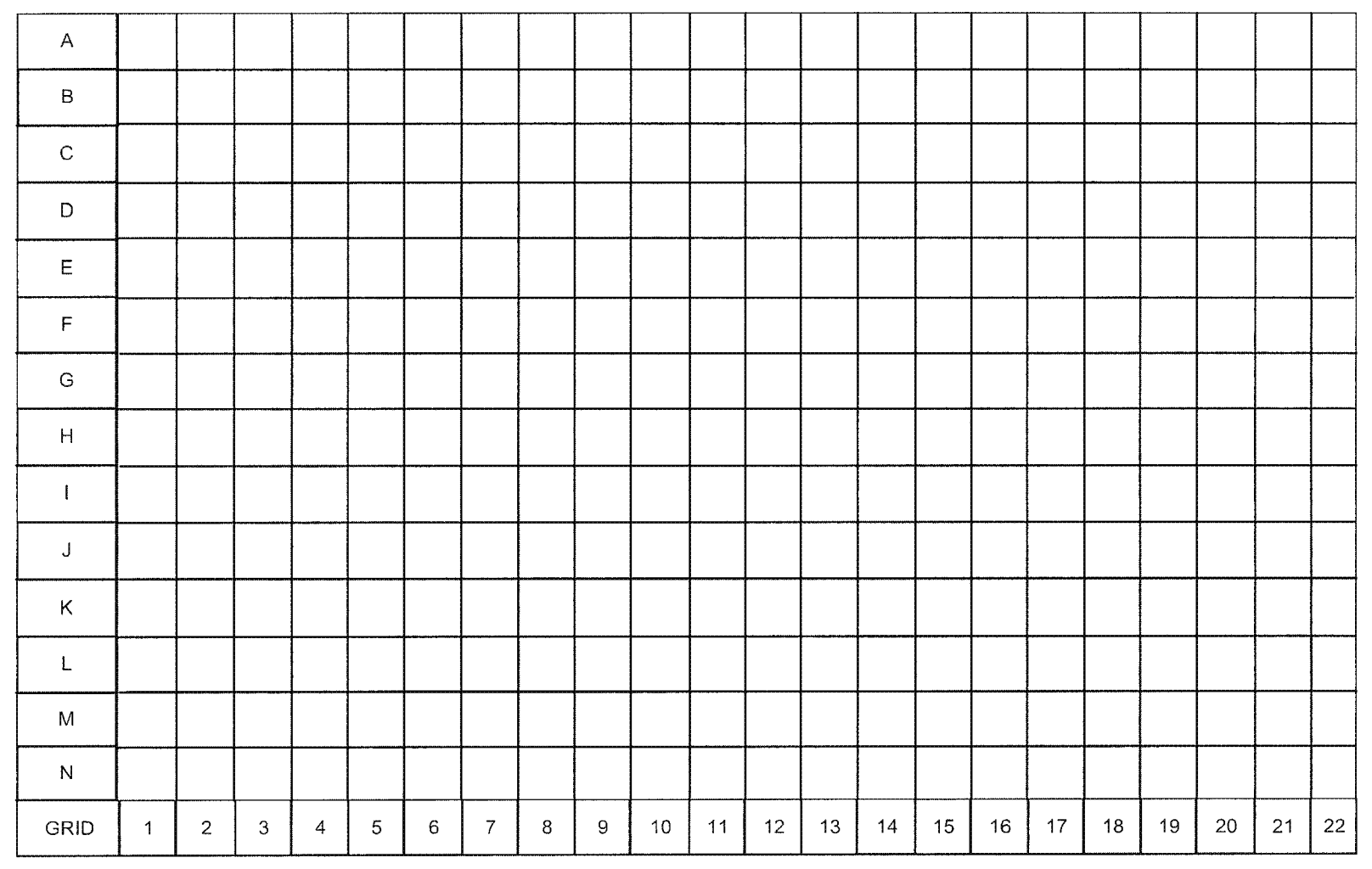

FIGS. 13a-13c illustrates an example portion of a user interface screen of a browser, displayed on a display of a client terminal via a browser application, wherein lines of a gild are adjusted based on line distance factors, according to an example embodiment.

FIG. 15 illustrates an example portion of a user interface screen of a browser, displayed on a display of a client terminal via a browser application, wherein a grid includes a smaller-sized grid in a drill-down mode, according to an example embodiment.

DETAILED DESCRIPTION

Figure 1:
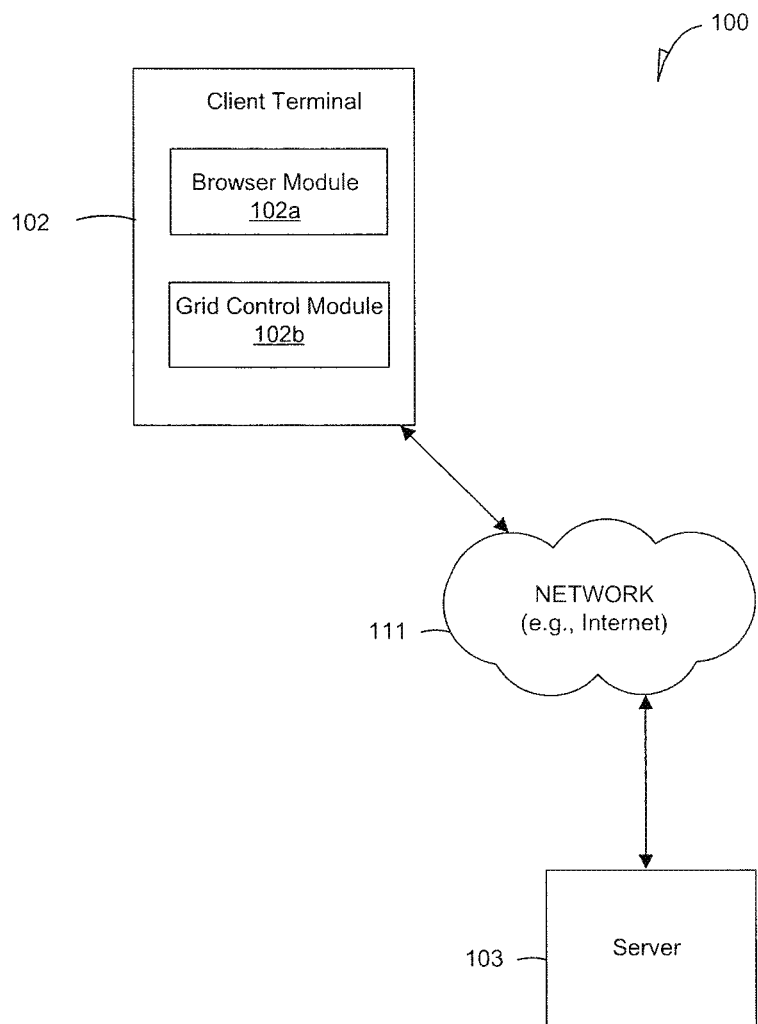
FIG. 1 is a block diagram illustrating an environment for navigating content, such as the content of a webpage which may be accessed over a network such as the Internet, according to example embodiment.

In the following description, for purposes of explanation, numerous specific details are set forth in order to provide a thorough understanding of some example embodiments. It will be evident, however, to one skilled in the art that the present invention may be practiced without these specific details.

Referring now to the drawings, wherein like reference numerals designate identical or corresponding parts throughout the several views, there is described tools (systems, apparatuses, methodologies, computer program products, etc.) for improved system for navigating content, such as the content of a webpage which may be accessed over a network such as the internet.

For example, FIG. 1 illustrates an environment 100 (e.g., a system) for navigating content, such as the content of a webpage which may be accessed over a network such as the Internet. As illustrated in FIG. 1, the environment 100 includes a client terminal 102 connected to a network 111 (such as the Internet) to communicate with server 103. The server may be associated with a webpage, and or may host a webpage accessible by a browser application operating on the client terminal 102. That is, a user may utilize a web browser application (e.g. browser module 102a) of the client terminal 102 to connect to the network 111 and access the webpage hosted by the server 103.

The client terminal 102 includes a browser module 102a and grid control module 102b. The browser module 102a may correspond to a conventional browser application operating on the client terminal, and the browser module 102a of the client terminal 102 is operable to access a webpage including content that is hosted on the server 103, via the network 111, and display the webpage (or cause the webpage to be displayed) on a display of the client terminal 102.

Figure 2:
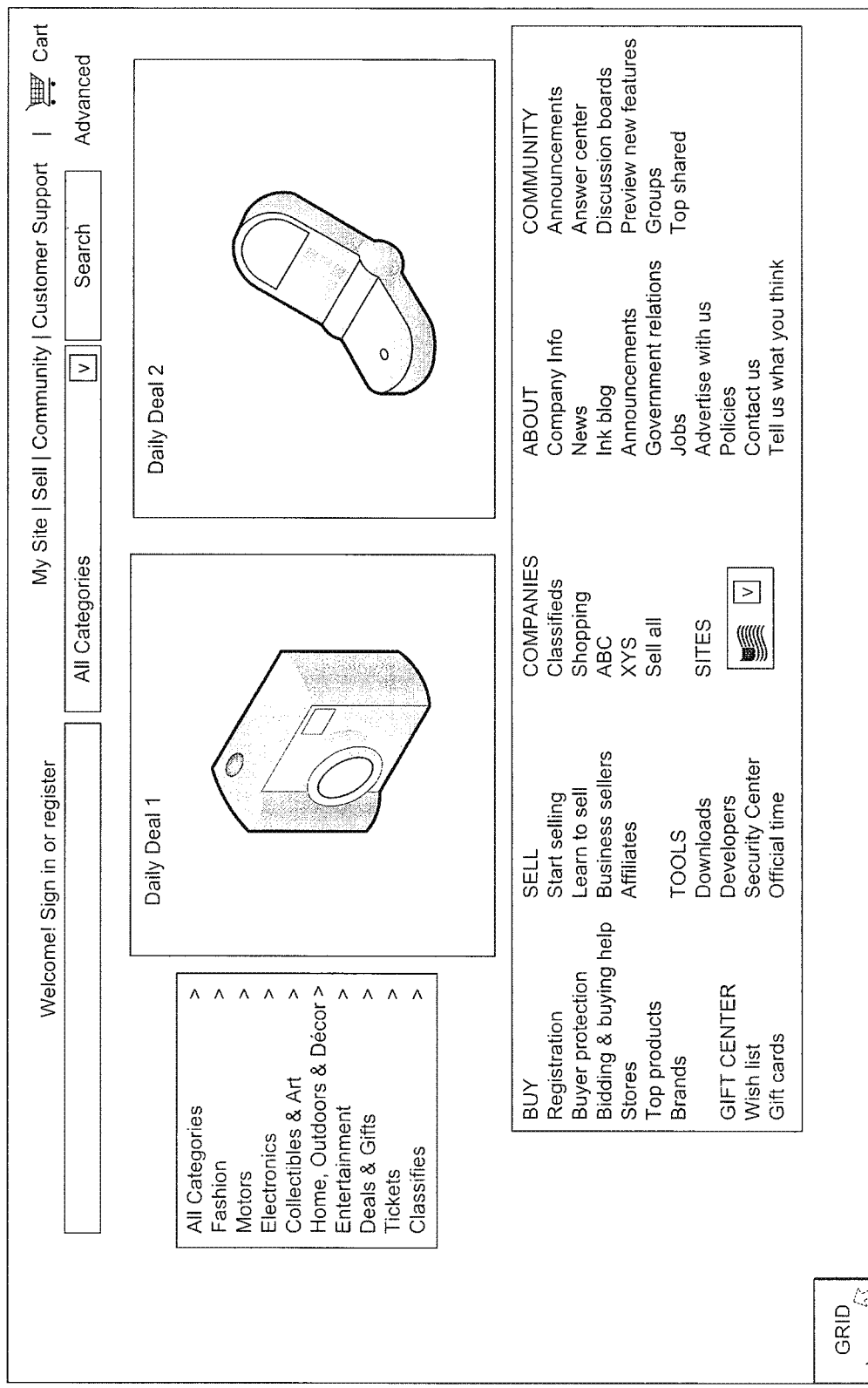
FIG. 2 illustrates an example portion of a user interface screen of a browser, displayed on a display of a client terminal via a browser application, according to an example embodiment.

FIG. 2 illustrates an example portion of a webpage 200 that is displayed on a display of the client terminal 102, via the browser module 102a. The webpage may be hosted by the server 103, for example. The webpage 200 may include a grid selection button 202 (also referred to herein as a grid view button or grid view option button), which may be positioned in the button left hand corner of the display, for example, as illustrated in FIG. 2. The grid selection button 202 may be generated and/or rendered by the browser module 102a and/or grid control module 102b based on instructions stored locally on the client terminal or based on instructions received from the server 103, or based on instructions/code (e.g. HTML or JavaScript) associated with the webpage hosted on the server 103.

Figure 3:
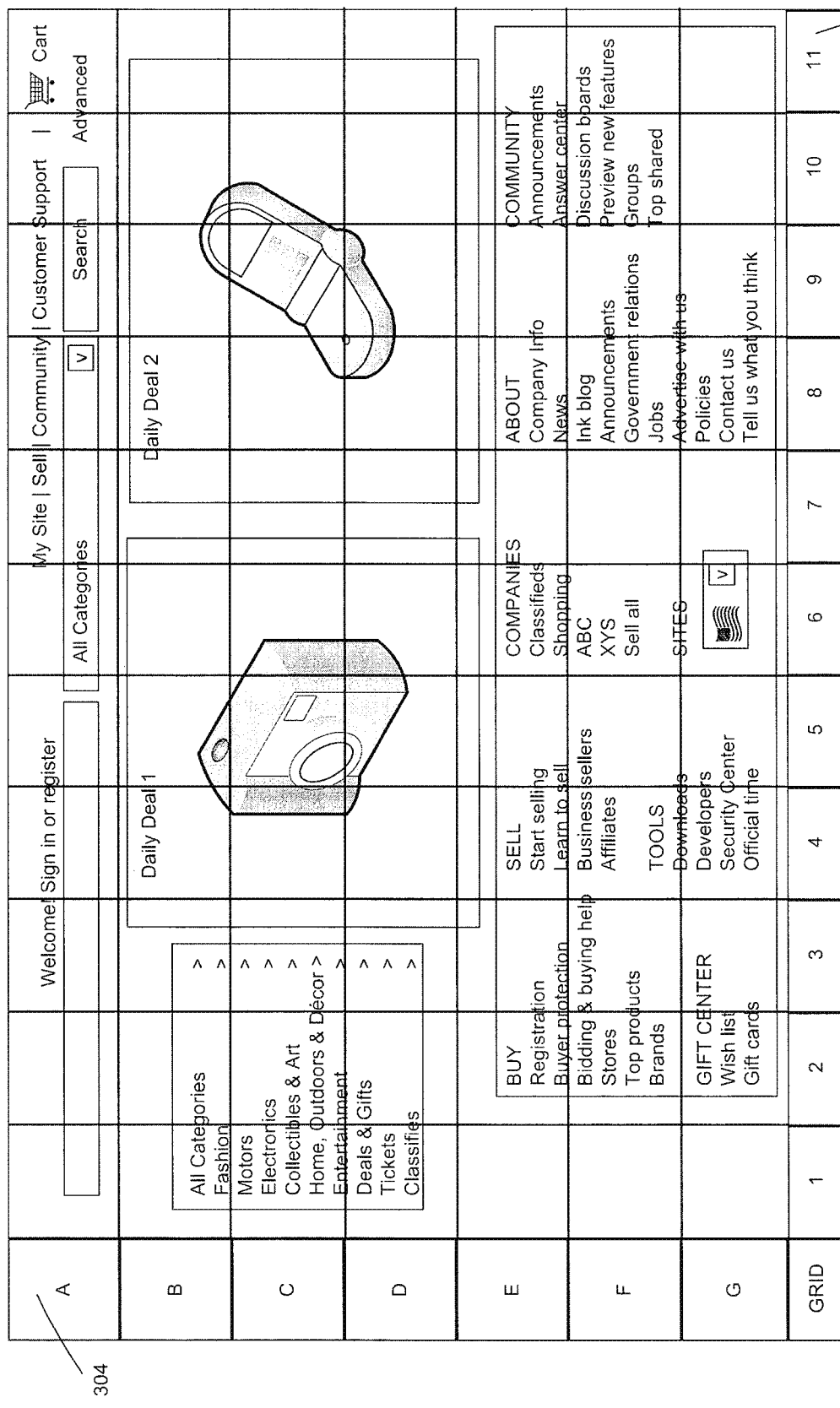
FIG. 3 illustrates an example portion of a user interface screen of a browser, displayed on a display of a client terminal via a browser application, wherein a grid is overlaid over the content of a webpage, according to an example embodiment.

When the user of the client terminal 102 selects the grid selection button 202 displayed on the display of the client terminal, the grid control module 102b detects the user selection of the grid selection button 202, and the grid control module 102b causes the browser module 102a to display a grid on the display of the client terminal. The grid may be superimposed over the content of the webpage 200, as illustrated in FIG. 3. The grid may be generated by the grid control module 102b at the client terminal 102 side, or by a similar grid control module at the server 103 side.

As illustrated in FIG. 3, the grid, as initially generated, includes plural parallel horizontal lines that are evenly spaced, as well as plural parallel vertical lines that are evenly spaced. The plural horizontal lines are generated according to a vertical axis 304, and the plural vertical lines are generated according to a horizontal axis 302. The horizontal 302 axis includes plural alphanumeric indicia (e.g. numbers 1-11) that each identify a column of the grid bounded by at least two of the vertical lines. Similarly, the vertical 304 axis includes plural alphanumeric indicia (e.g. characters A through G) that each identify a row of the grid bounded by at least two of the horizontal lines. Each cell of the grid may be subsequently identified using the alphanumeric indicia of the corresponding column and row.

The grid selection button 202 may operate based on a toggle approach, according to an exemplary embodiment. That is, the grid first appears when the user clicks the grid selection button 202. Thereafter, the grid will persist in place, even if the user clicks on a link or moves to a different webpage, until the user clicks the grid button 202 again, at which point the grid will be removed.

Thus, according to the exemplary embodiments of this disclosure, when a user accesses a webpage (e.g., via a network such as the Internet) and views the webpage, on a display of the user's terminal, the user may click on a grid view button, and a grid is displayed on the display of the user terminal. The grid may include horizontal and vertical grid lines and corresponding grid indicia that are superimposed over the content of the webpage. Therefore, the user can easily navigate the content of the webpage, by referring to the grid lines and corresponding grid indicia to identify different parts of the webpage.

The exemplary embodiments of this disclosure are applicable in a wide variety of situations in various fields. For example, a customer browsing a webpage may have a specific question regarding whether a particular feature is available on the webpage and, if so, where that feature can be found on the webpage. Conventionally, the customer contacts a customer service representative of the webpage organization (typically via telephone), but the customer service representative can only describe orally to the user where on the webpage the appropriate features may be found.

In contrast, in accordance with the exemplary embodiments of this disclosure, both the customer service representative and the user may view the same webpage via their respective terminals, and select the grid view option when viewing the webpage. Thus, both the customer service representative and the user will be able to communicate meaningful information about the webpage by quoting the appropriate indicia of the grid. For example, with reference to example webpage of FIG. 3, if the user wants to know where the "Policies" section of the webpage is, a customer service representative can identify that section as being within cell "G-8".

Meanwhile, in an educational environment, such as class being conducted by an instructor (or likewise in a training environment, such as a seminar being presented by a speaker), the instructor may be presenting information to a group of students that each has their own computer workstations. Conventionally, the instructor may have to describe orally to the students how to perform certain operations on their computer terminals, such as navigating a webpage displayed on the displays of the terminals.

In contrast, in accordance with the exemplary embodiments of this disclosure, both the instructor and the students may view the same webpage via their respective terminals, and select the grid view option when viewing the webpage. Thus, both the instructor and students will be able to communicate meaningful information about the webpage by quoting the appropriate indicia of the grid. For example, with reference to example webpage of FIG. 3, the instructor may say to the class: "Please see the 'Policies' section of the webpage within cell 'G-8'. Thus, the present invention allows an instructor to keep a class of students on the same page, and greatly facilitates the instructor's ability to guide the navigation of a webpage of other content by large groups of people (especially when the people are viewing the content for the first time, or where complex steps are involved).

While the exemplary embodiments of this disclosure refer to a grid view being applied to a webpage viewed on a display of a terminal, the grid view may in fact be applied to any information being displayed on the display of the terminal. For example, the grid view may be superimposed over the displayed content of a browser application, word processing application, spreadsheet application, presentation application, video game application, or any other application that displays content on a display of a terminal.

The client terminal 102 and/or server 103 may be any network-connected device including but not limited to a personal, notebook or workstation computer, a terminal, a kiosk, a PDA (personal digital assistant), a tablet computing device, a smartphone, a scanner, a printer, a plotter, a facsimile machine, a multi-function device (MFD), a server, a mobile phone or handset, another information terminal, etc. Each device may be configured with software allowing the device to communicate through networks with other devices.

Figure 4:
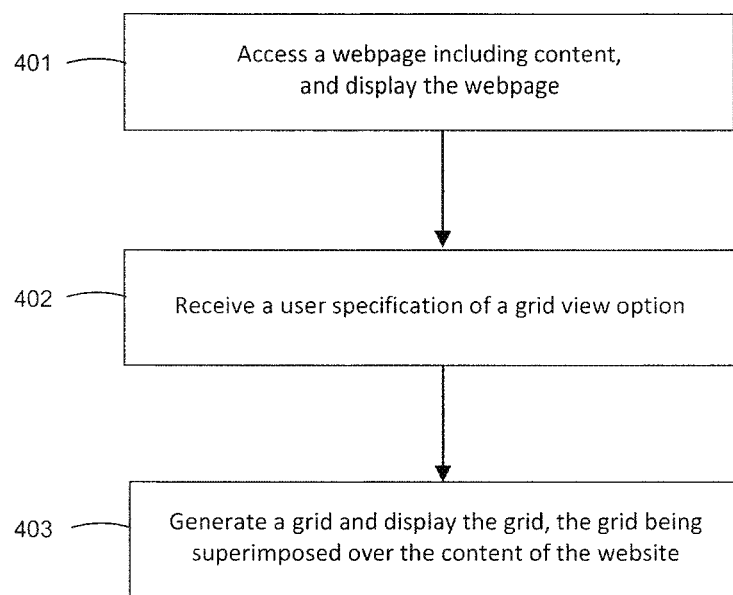
FIG. 4 illustrates a flowchart of a method performed by a client terminal, according to an example embodiment.

FIG. 4 is a flow chart illustrating a method performed by a client terminal, such as client terminal 102 illustrated in FIG. 1, in accordance with an example embodiment. The method of FIG. 4 may be performed by any of the modules, logic, or components described herein in connection with the client terminal 102.

In step 401, the client terminal accesses a webpage including content, and displays the webpage at the client terminal 102. An example of a webpage displayed on a display of a client terminal is illustrated in FIG. 2. Then, in step 402, the terminal receives a user specification of a grid view option. For example, the client terminal 102 may receive a user selection of the grid view button 202 illustrated in FIG. 2, which is displayed by the browser application of the terminal on the display of the terminal. In step 403, the client terminal 102 generates and displays the grid. The grid may be superimposed over the content of the webpage, as illustrated in FIG. 3. In other instances, the grid may be otherwise incorporated into the display of the webpage using, for example, different colors, different textures, sounds played as the grid is traversed, different haptic (e.g. vibrations) as the grid is traversed, altering speed/resistance of mouse cursor movement as the grid is traversed.

As described above, various aspects of this exemplary embodiment may be performed at the client side, e.g. by executing instructions stored in a memory and executed by a processor of the client terminal 102. However, it is appreciated by those of ordinary skill in the art that the aforementioned aspects may be performed remotely, or are performed at the server side.

Figure 5:
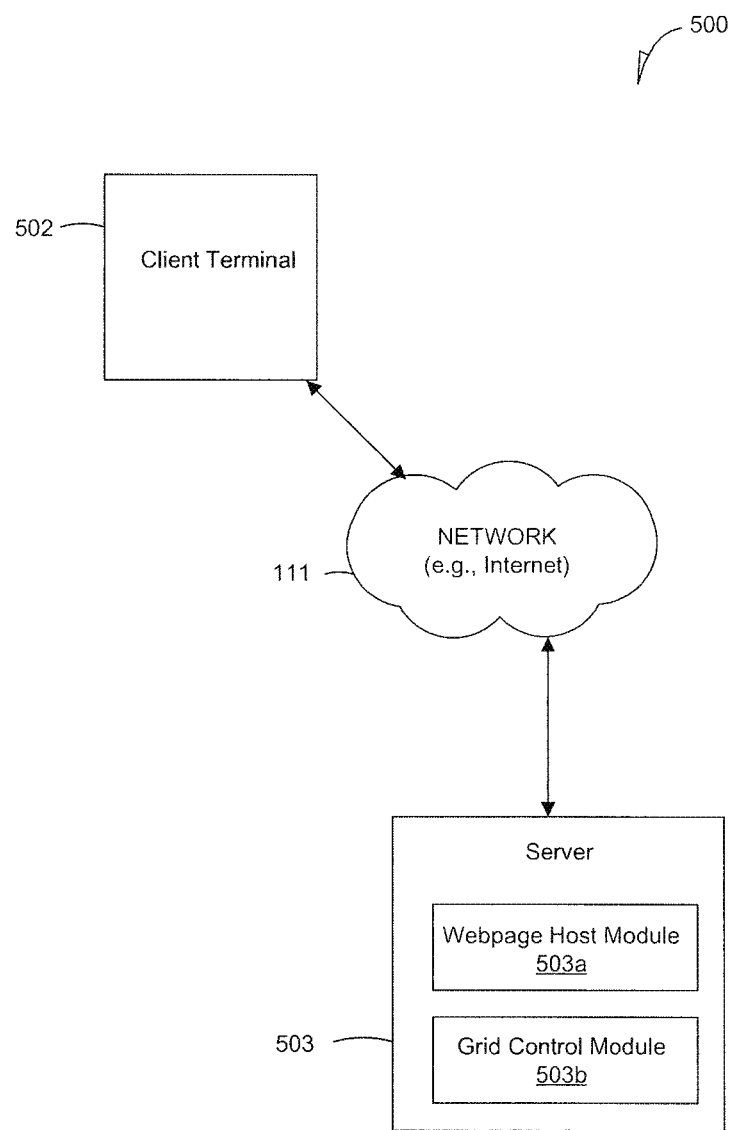
FIG. 5 is a block diagram illustrating an environment for navigating content, such as the content of a webpage which may be accessed over a network such as the Internet, according to another example embodiment.

For example, FIG. 5 illustrates an environment 500 (e.g., a system) similar to the environment 100 illustrated in FIG. 1, wherein a more detailed illustration of the server 103 is provided, according to an exemplary embodiment. The client terminal 502 may be similar to client terminal 102, and may include a browser application similar to the browser module 102*a* of the client 102 illustrated in FIG. 1.

The server 503 includes a webpage host module 503*a* and a grid control module 503*b*. The webpage host module 503*a* is operable to host a webpage including content, the webpage being accessible by a browser application of a client terminal (e.g. 502). FIG. 2 illustrates an example of a webpage 200 that is accessed by a browser application and displayed OD the display of the client terminal 502, wherein the webpage is hosted by the webpage host module 503*a* of the server 503. The grid control module 503*b* of the server 503 is operable to receive a user request to activate a grid view option from the client terminal 501. For example, when the user selects the grid selection button 202 illustrated in FIG. 2, the user's terminal 502 transmits data to the server 503 indicating that the user has selected the grid selection button 202.

Once the grid control module 503*b* receives the user specification of the grid view option, the grid control module 503*b* generates a grid and causes the browser application of the client terminal (e.g. 502) to display the grid on the display of the client terminal, such that the grid is superimposed over the content of the webpage, as illustrated in FIG. 3. For example, the grid control module 503*b* may generate code (e.g. HTML5 JavaScript) for the grid, and associate the code with the webpage hosted on the server 503 that is accessed by the browser application of the client terminal 502. Alternatively, such code may be transmitted in the form of instructions to the browser application of the client terminal 502. The grid may then be displayed on the display of the client terminal (e.g. 502), such that the grid is superimposed over the content of the webpage displayed on the display of the terminal, as illustrated in FIG. 3.

Figure 6:
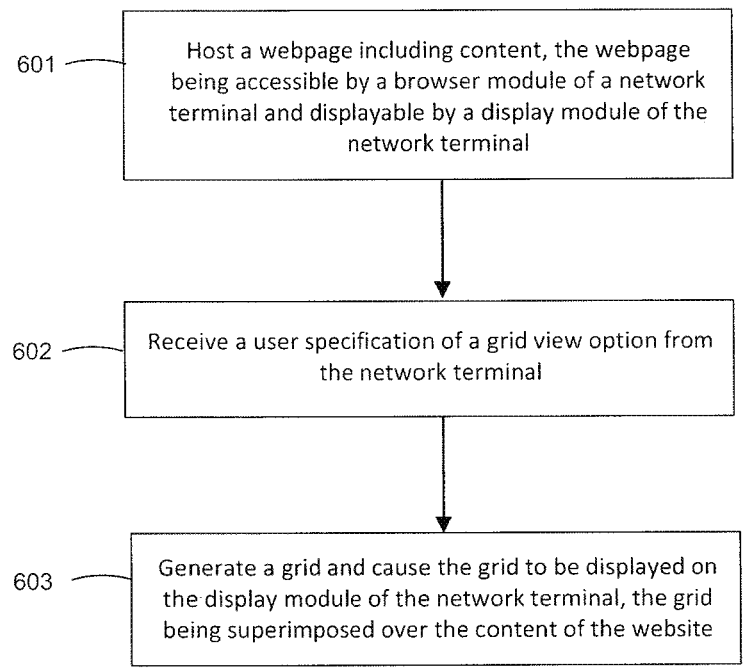
FIG. 6 illustrates a flowchart of a method performed by a server, according to an example embodiment.

FIG. 6 is a flow chart illustrating a method performed by a server, such as server 503 illustrated in FIG. 5, in accordance with an example embodiment. The method of FIG. 6 may be performed by any of the modules, logic, or components described herein.

In step 601, the server hosts a webpage including content, the webpage being accessible by a browser application of a client terminal and displayable on a display of a client terminal, such as client terminal 502. An example of a webpage displayed on a display of a client terminal is illustrated in FIG. 2. Then, in step 602, the server receives a user specification of a grid view option. For example, the terminal may detect user selection of the grid view button 202 illustrated in FIG. 2, and transmit a detection signal to the server. In step 603, the server generates a grid and causes the grid to be displayed on the display of the client terminal, the grid being superimposed over the content of the webpage, as illustrated in FIG. 3.

According to an aspect of an exemplary embodiment, after the grid control module 102*b* of the client terminal 102 (see FIG. 1) receives a user selection of one or more of the indicia of the grid, the grid control module 102*b* causes the browser module 102*a* to display a visual marking proximate to a grid cell identified by the user selected indicia. Similarly, according to another aspect, after the grid control module 503*b* of the server 503 (see FIG. 5) receives a user selection of one or more of the indicia of the grid, the grid control module 503*b* of the server 503 causes the browser application of the terminal 502 to display a visual marking proximate to a grid cell identified by the user selected indicia.

Figure 7:
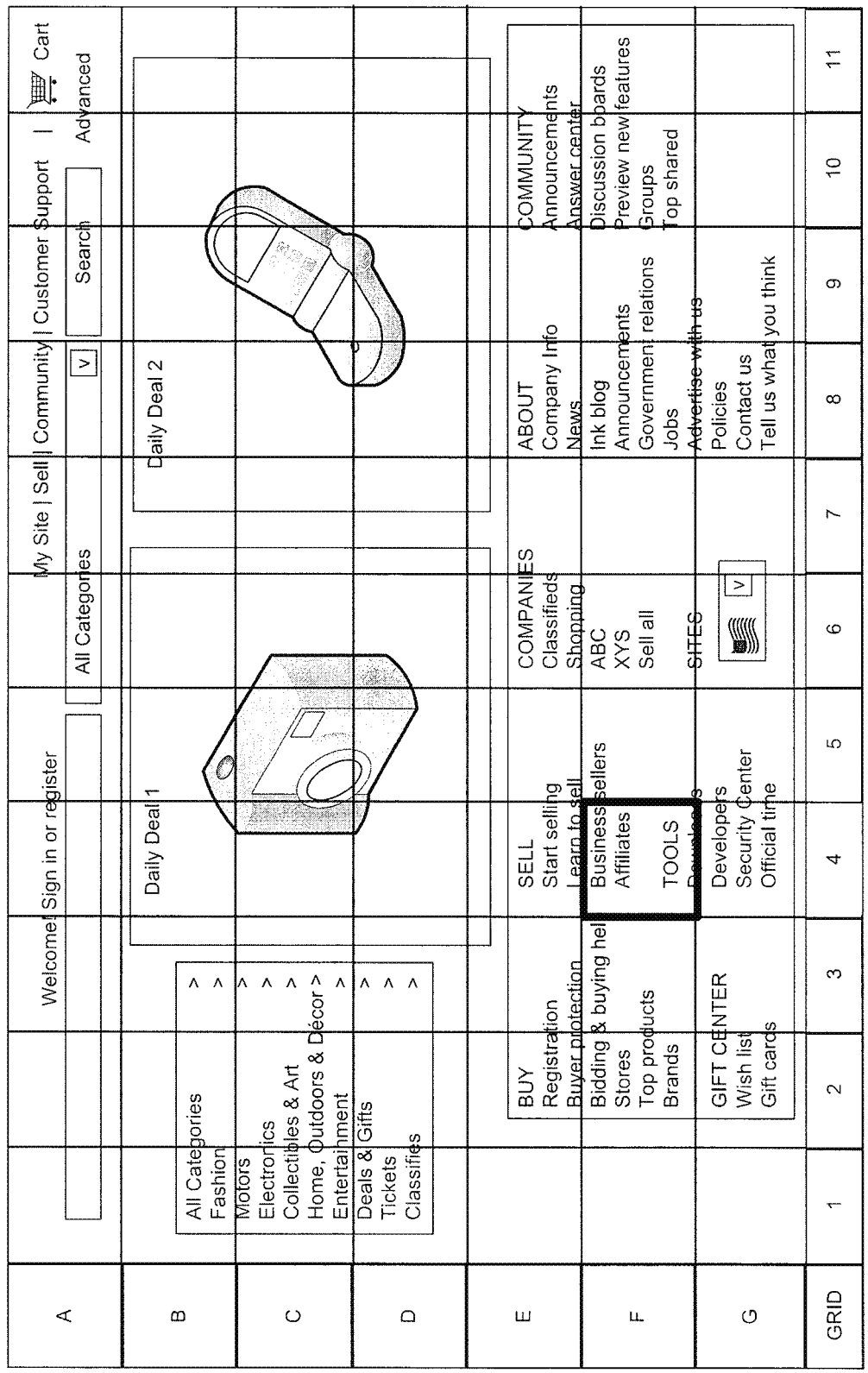
FIG. 7 illustrates an example portion of a user interface screen of a browser, displayed on a display of a client terminal via a browser application, wherein a grid is overlaid over the content of a webpage, according to an example embodiment.

More specifically, after the display of the terminal displays the grid (see FIG. 2), the user may select one or more of the indicia of the grid. For example, the user may utilize a mouse to click on one or more of the indicia. As another example, if the display of the client terminal displaying the webpage and grid is a touchscreen, the user may select one or more of the indicia on the touchscreen. After the user selects indicia, such as "F" and "4", the cell grid of the grid corresponding to the selected indicia (i.e. the grid corresponding to F-4) may be marked visually, as seen in FIG. 7. The visual marking may be highlighting the appropriate cell, changing the shading of the appropriate cell, changing a transparency factor of the appropriate cell, etc. The visual marking may be also include changing the color, line width, line weight or line style of the lines surrounding the appropriate grid cell.

Thus, simply by clicking on the desired indicia, the user is able to immediately see the appropriate grid cell corresponding to the indicia, to more easily navigate the content of the webpage.

Figure 8:
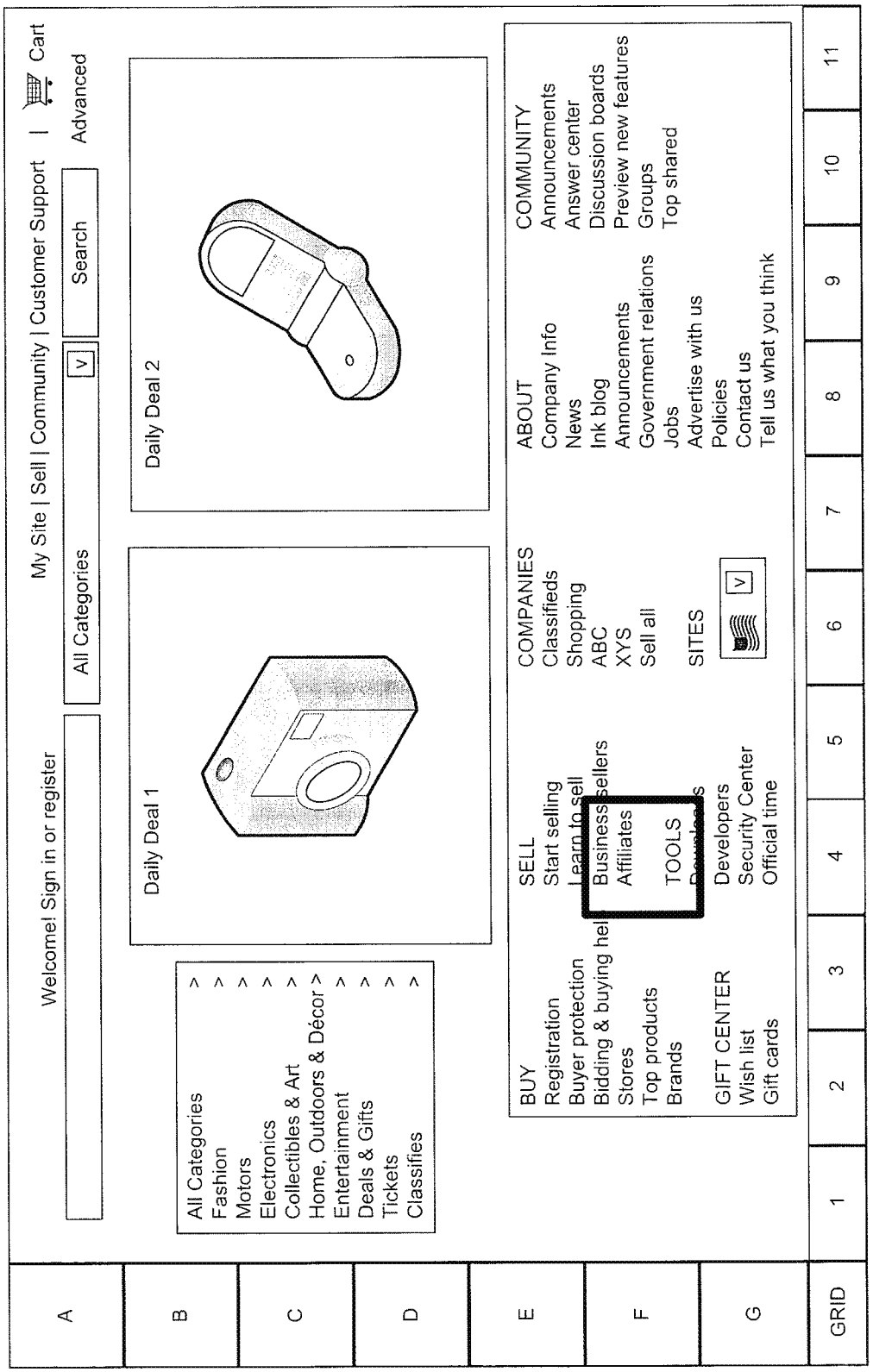
FIG. 8 illustrates an example portion of a user interface screen of a browser, displayed on a display of a client terminal via a browser application, wherein a grid is overlaid over the content of a webpage, according to an example embodiment.

Instead or in addition, after the user selects one or more of the indicia, the visual display of all the other non-identified cells may also be changed, in order to better highlight and enunciate the relevant cell to the user. For example, as seen in FIG. 8, the lines corresponding to all the other cells (other than the user selected cell F-4) may be removed. As another example, a transparency factor of each grid cell of the grid—other than the grid cell of the grid identified by the user selected indicia—may be changed, such that only the webpage content of the grid cell identified by the user-selected indicia is fully transparent, whereas the webpage content under all the other grid cells appears obscured and/or opaque.

According to this aspect, after the grid control module 102b of the client terminal 102 (see FIG. 1) receives a user selection of one or more of the indicia of the grid, the grid control module 102b changes the visual display of all the other non-selected cells. Similarly, according to this aspect, after the grid control module 503b of the server 503 (see FIG. 5) receives a user selection of one or more of the indicia, the grid control module 503b of the server 503 causes the browser application of the terminal 502 to change the visual display of all the other non-relevant cells.

Figure 9A:
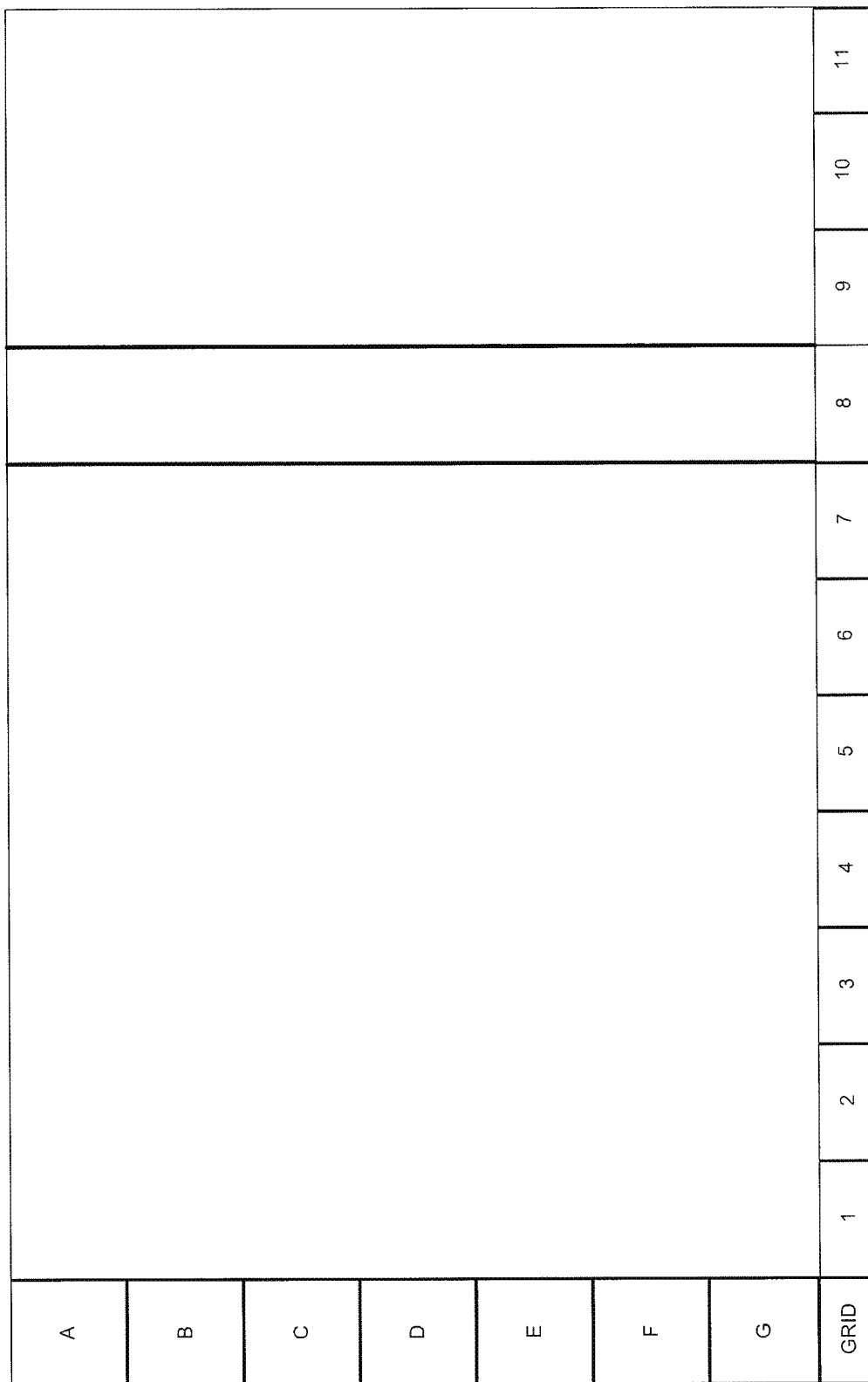
Figure 9B:
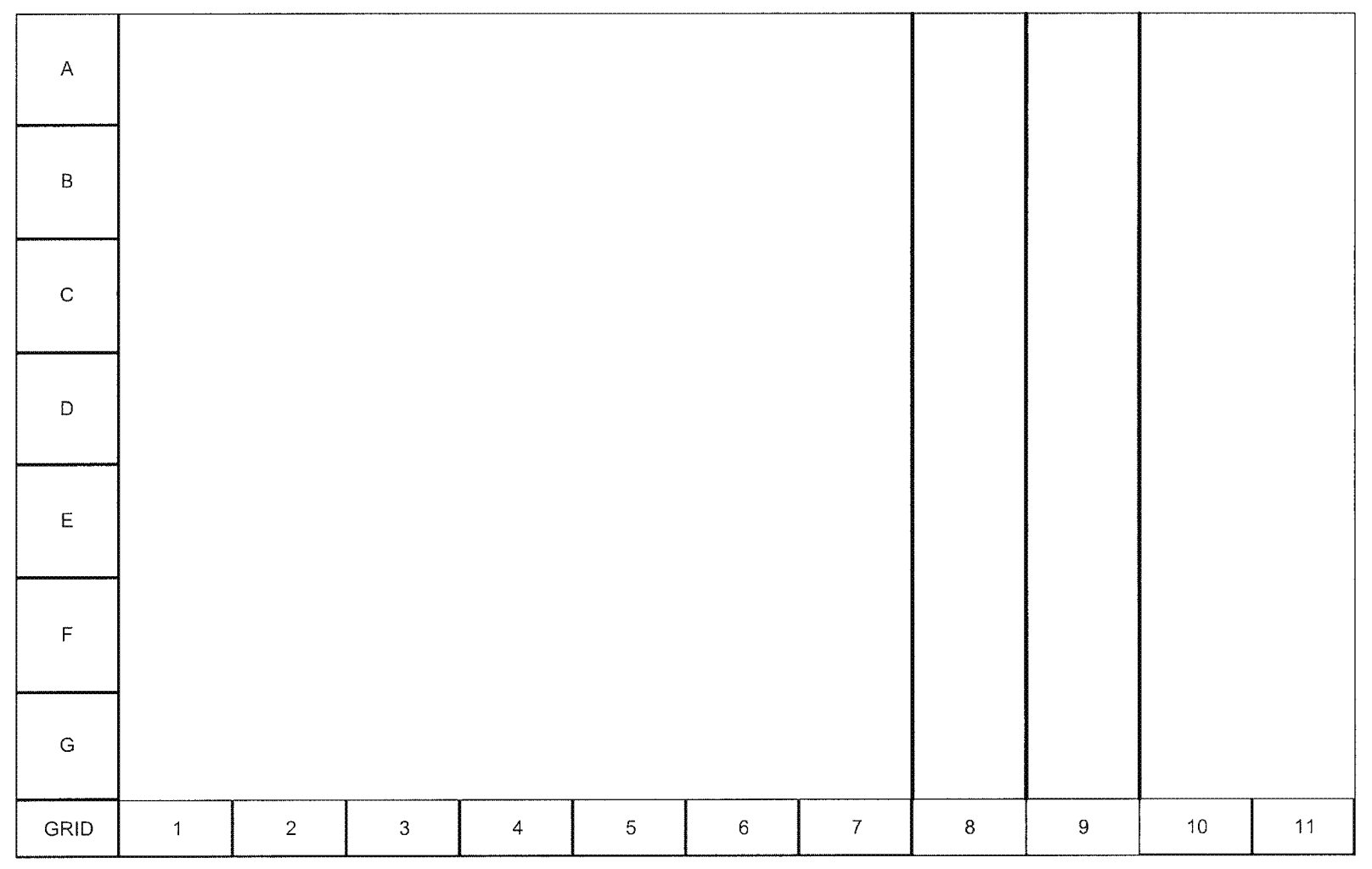

According to another exemplary embodiment, when the user selects the grid view option, the horizontal and vertical axes (including the indicia) appear, but the horizontal and vertical lines of the grid do not. Thereafter, when the user selects indicia, only the grid cell(s) corresponding to the user selected indicia appear, (see FIG. 9a wherein the user selects indicia '8', see FIG. 9b wherein the user further selects indicia '9', and FIG. 9c wherein the user further selects indicia 'F'). Thus, the user can more easily navigate the content of the webpage, by clearly seeing, only the grid cells corresponding to the relevant indicia. This operation may be performed by, for example, the grid control module 102b of the terminal 102 or the grid control module 503b of the server 503. The content of the webpage underneath the grid is not shown in FIG. 9a through 9d in the interests of clarity.

Figure 9C:
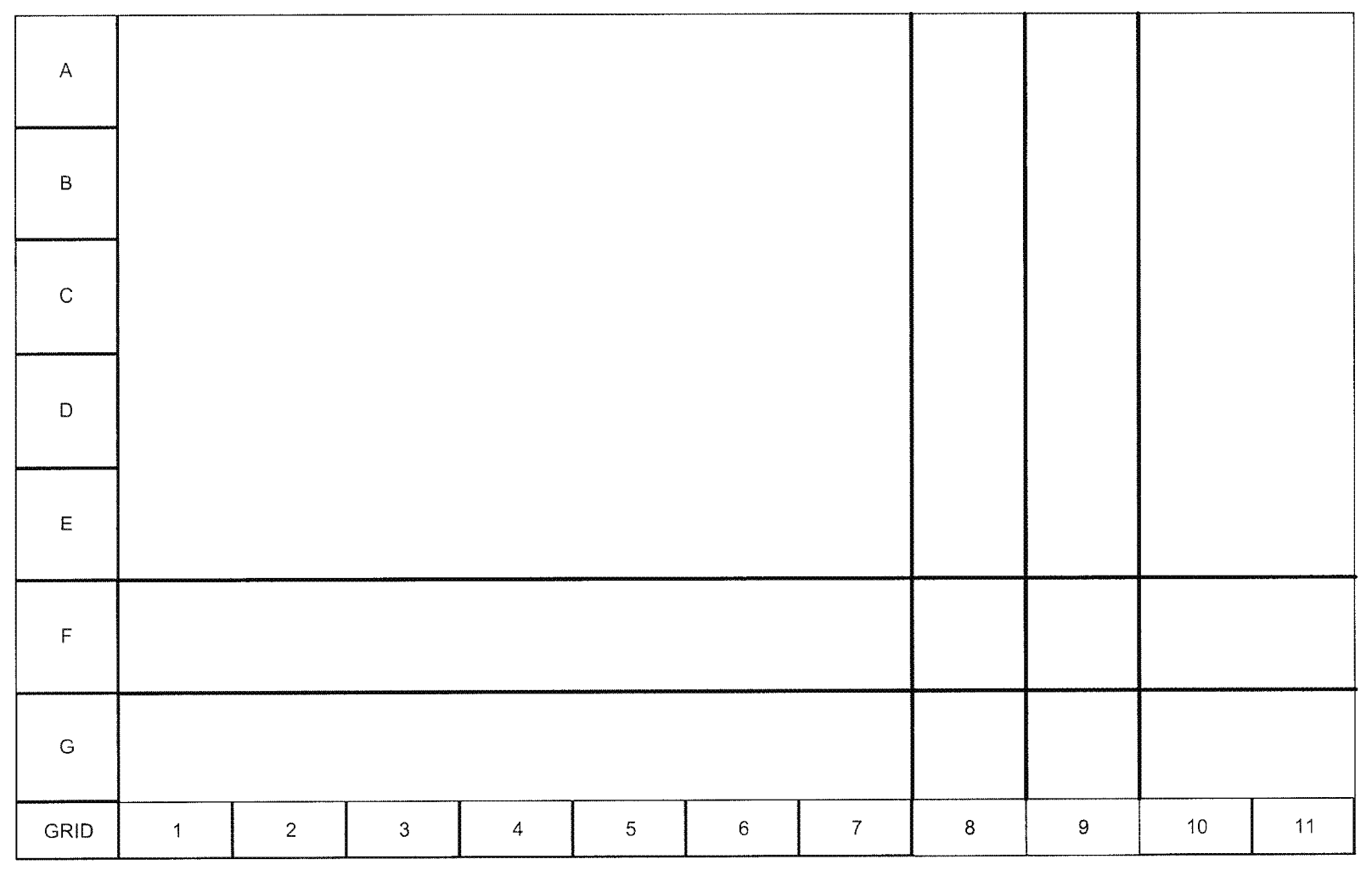
Figure 9D:
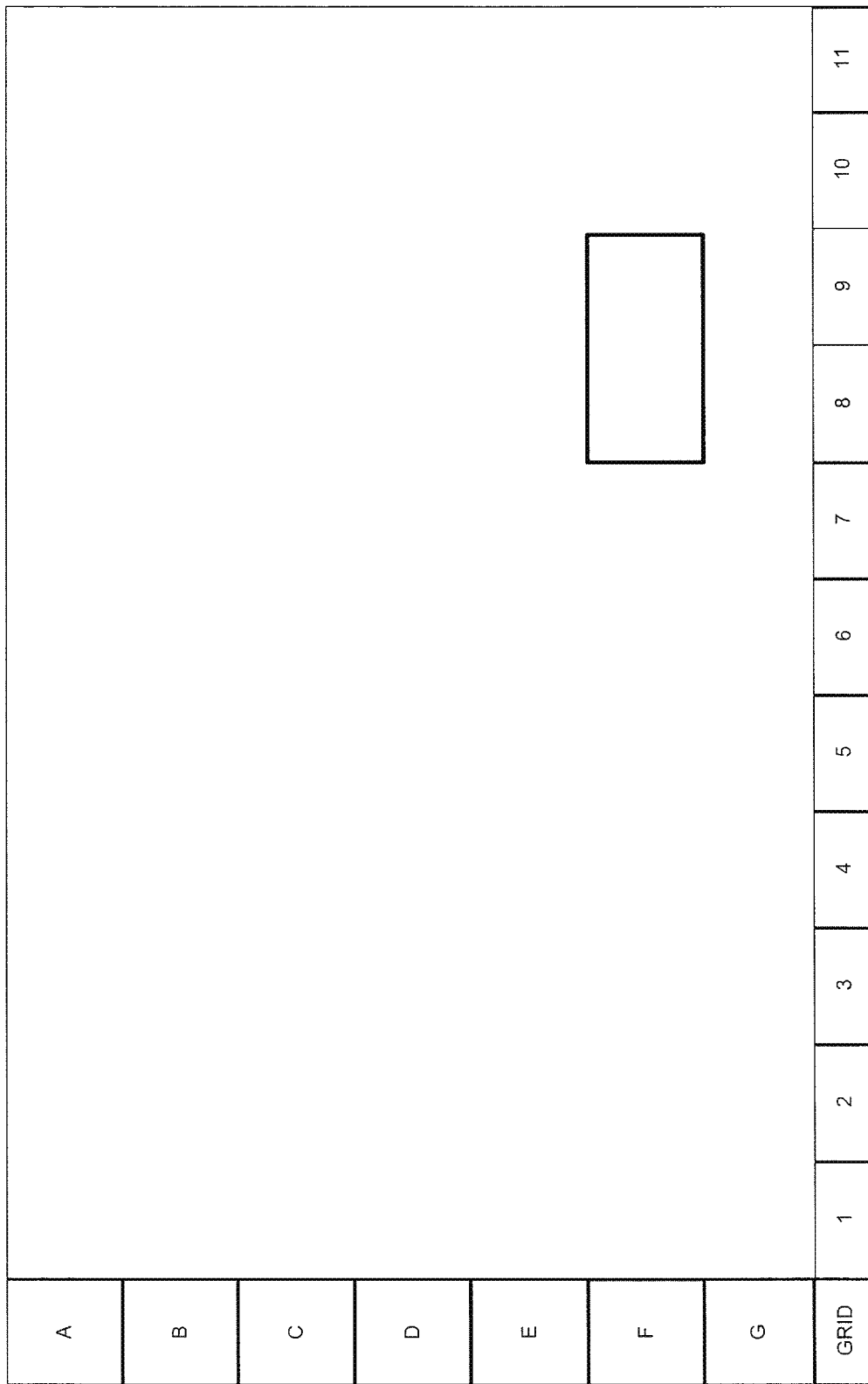

Moreover, according to this exemplary embodiment, once indicia with overlapping cells have been selected (i.e. at least one horizontal axis indicia and at least one vertical axis indicia have been selected), only the lines around the overlapping grid cell are displayed, and all other lines of the grid are removed. For example, as illustrated in FIG. 9c, the user has already selected indicia '8' and '9', and the user further selects indicia 'F'. Since the grid cells corresponding to all the selected indicia overlap, only the lines around the overlapping grid cell are displayed, and all other lines of the grid are removed, as seen in FIG. 9d. The grid may be adjusted in this way by, for example, the grid control module 102b of the terminal 102 or the grid control module 503b of the server 503. Thus, the user can more easily navigate the content of the webpage, by clearly seeing only the overlapping grid cells corresponding to the relevant indicia.

Figure 10:
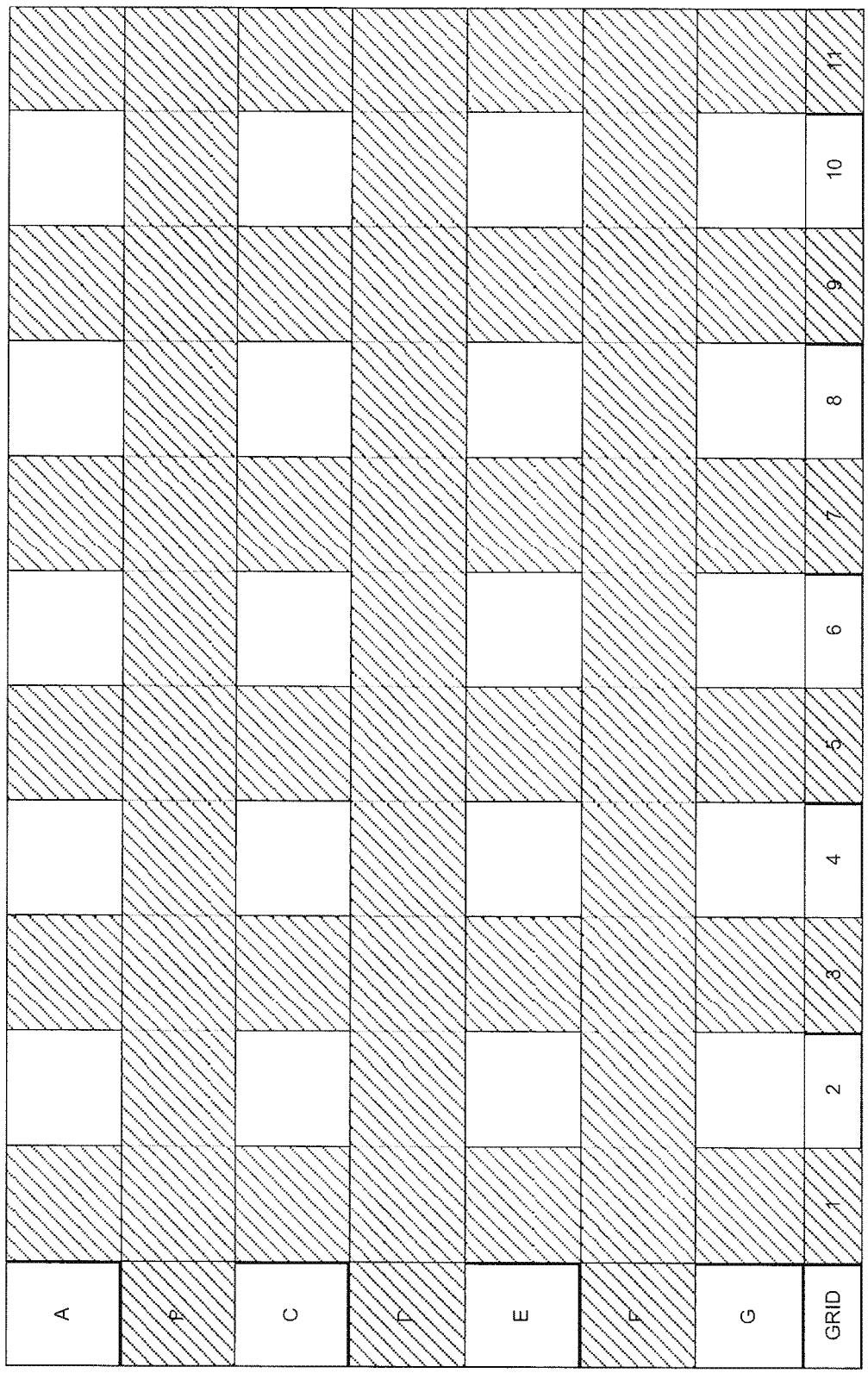
FIG. 10 illustrates an example portion of a user interface screen of a browser, displayed on a display of a client terminal via a browser application, wherein a grid is overlaid over the content of a webpage, according to an example embodiment.

Various other techniques may be used in order to aid the user in navigating the grid and the content of the webpage, based on appropriate indicia. For example, the cells may adopt a shading pattern, where the cells corresponding to every second vertical indicia (B, D, F, . . . ) and the cells corresponding to every second horizontal indicia (1, 3, 5, . . . ) are shaded, as illustrated in FIG. 10. Moreover, each of the cells may include a watermark or lightly shaded characters indicating the corresponding indicia, as illustrated in FIG. 11. The content of the webpage underneath the grid is not shown in FIG. 10 and FIG. 11 in the interests of clarity.

Turning now to FIGS. 12 and 13a-13c, according to another aspect of this disclosure, it is possible for the user to adjust the distance between each of the horizontal lines and vertical lines. When the user accesses the settings of the grid view option (e.g. by right-clicking the grid view button 202), the grid control module 102b or 502b may cause the browser application of the terminal to display the user interface 1201 of FIG. 12, which allows the user to select the spacing between the horizontal lines and the vertical lines (also referred to herein as a line distance factor). For example, when the user selects 'normal' spacing for both the horizontal and vertical axes, as illustrated in FIG. 12, the grid control module 102b causes the grid lines to appear as they do in FIG. 3. As another example, when the user selects 'double' spacing for both the horizontal and vertical axes, the grid control module 102b causes the grid lines to appear as they do in FIG. 13a. As yet another example, when the user selects '½' spacing for the horizontal axis and 'normal' spacing for the vertical axis, the grid control module 102b causes the grid lines to appear as they do in FIG. 13b. As yet another example. When the user selects 'half' spacing for both the horizontal and vertical axes, the grid control module 102b causes the grid lines to appear as they do in FIG. 13c. The content of the webpage underneath the grid is not shown in FIGS. 13a-13c in the interests of clarity. The aforementioned operations may be performed by, for example, the grid control module 102b of the terminal 102 or the grid control module 503b of the server 503.

Figure 14:
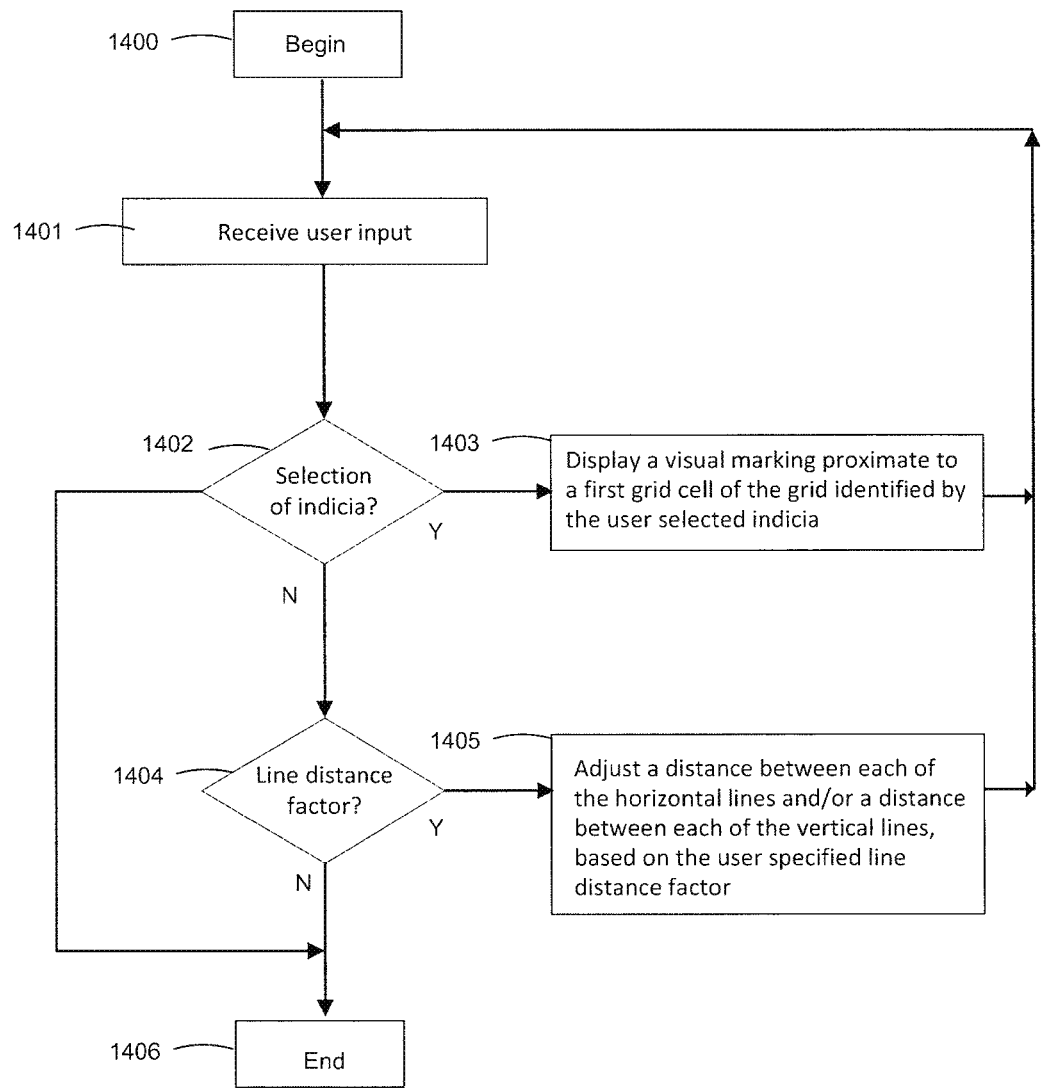
FIG. 14 illustrates a flowchart of a method performed by a client terminal or server, according to an example embodiment.

FIG. 14 is a flow chart illustrating a method performed by a terminal or a server, such as terminal 102 or server 503, in accordance with an example embodiment. The method of FIG. 14 may occur after the steps in the method of FIG. 4, or after the steps in the method of FIG. 6. The method of FIG. 14 may be performed by any of the modules, logic, or components described herein.

The method begins at step 1400, and in step 1401 the terminal or server detects user input. If the user input is a selection of one or more of the grid indicia (step 1402, Yes), the terminal or server causes the browser application of the terminal to display a visual marking proximate to a first grid cell of the grid identified by the user selected grid indicia (step 1403; see FIG. 7). Otherwise (step 1402, No), if the user input is a user selection of a line distance factor (step 1404, Yes), the server or terminal adjusts a distance between each of the horizontal lines and a distance between each of the vertical lines, based on the user specified line distance factor (step 1405: see FIGS. 12 and 13a-13c). The method then ends in step 1406.

Figure 15:
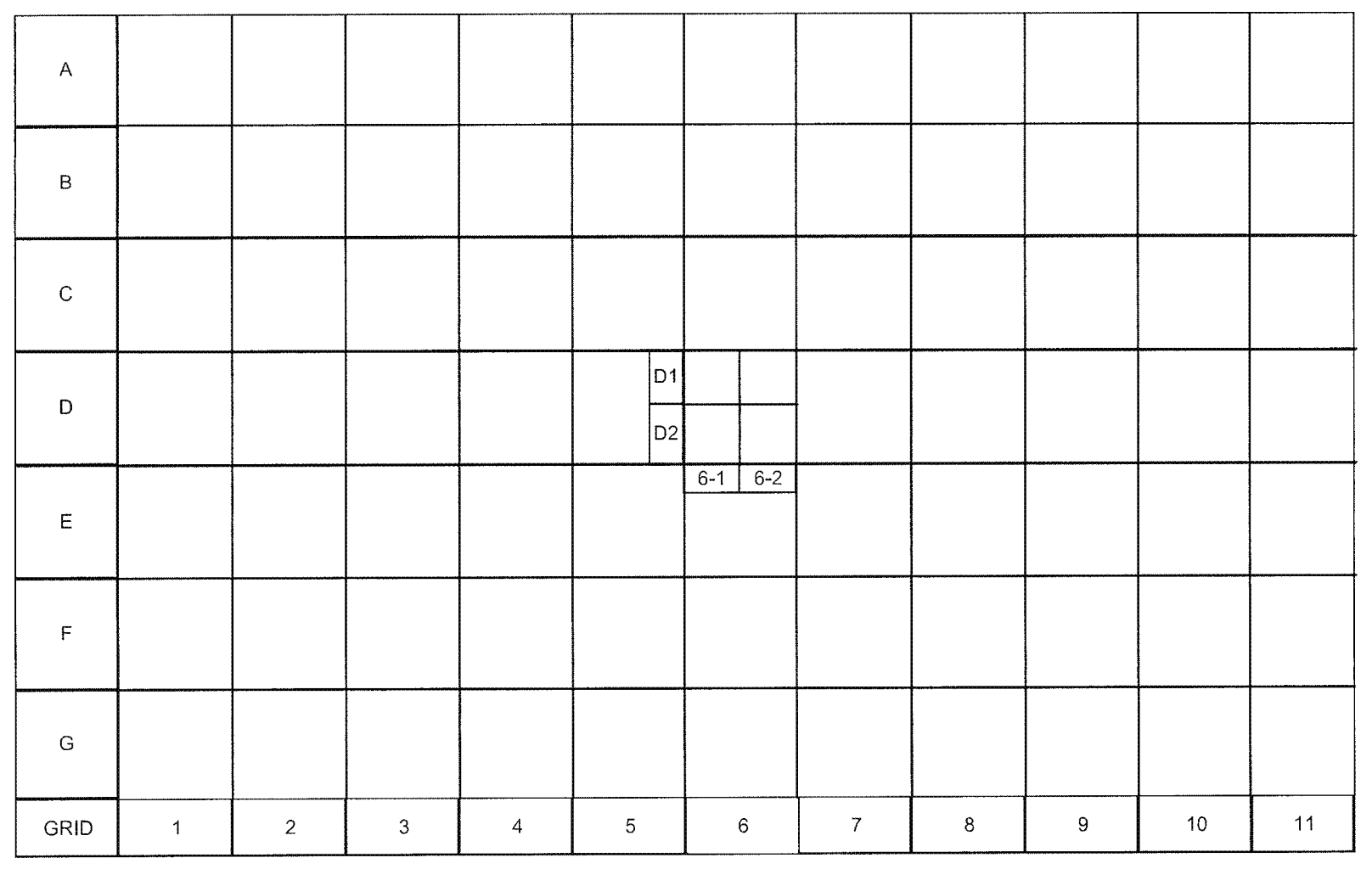

According to an exemplary embodiment, the user is able to select a drill-down mode (see FIG. 12). If the user turns the drill-down mode on, then when the user selects particular indicia, such as 'D' and '6', the grid control module 102b causes the browser module of the terminal to display a reduced-size grid within the grid cell identified by the user selected indicia (e.g. the cell corresponding to D6), as illustrated in FIG. 15. As seen in FIG. 15, the reduced-size grid may itself include horizontal and vertical line(s) connected to a vertical and horizontal axis, wherein the axes include indicia, similar to the indicia described in accordance with the aspects of this disclosure. The content of the webpage underneath the grid is not shown in FIG. 15 in the interests of clarity. This operation may be performed by, for example, the grid control module 102b of the terminal 102 or the grid control module 503b of the server 503.

Figure 16:
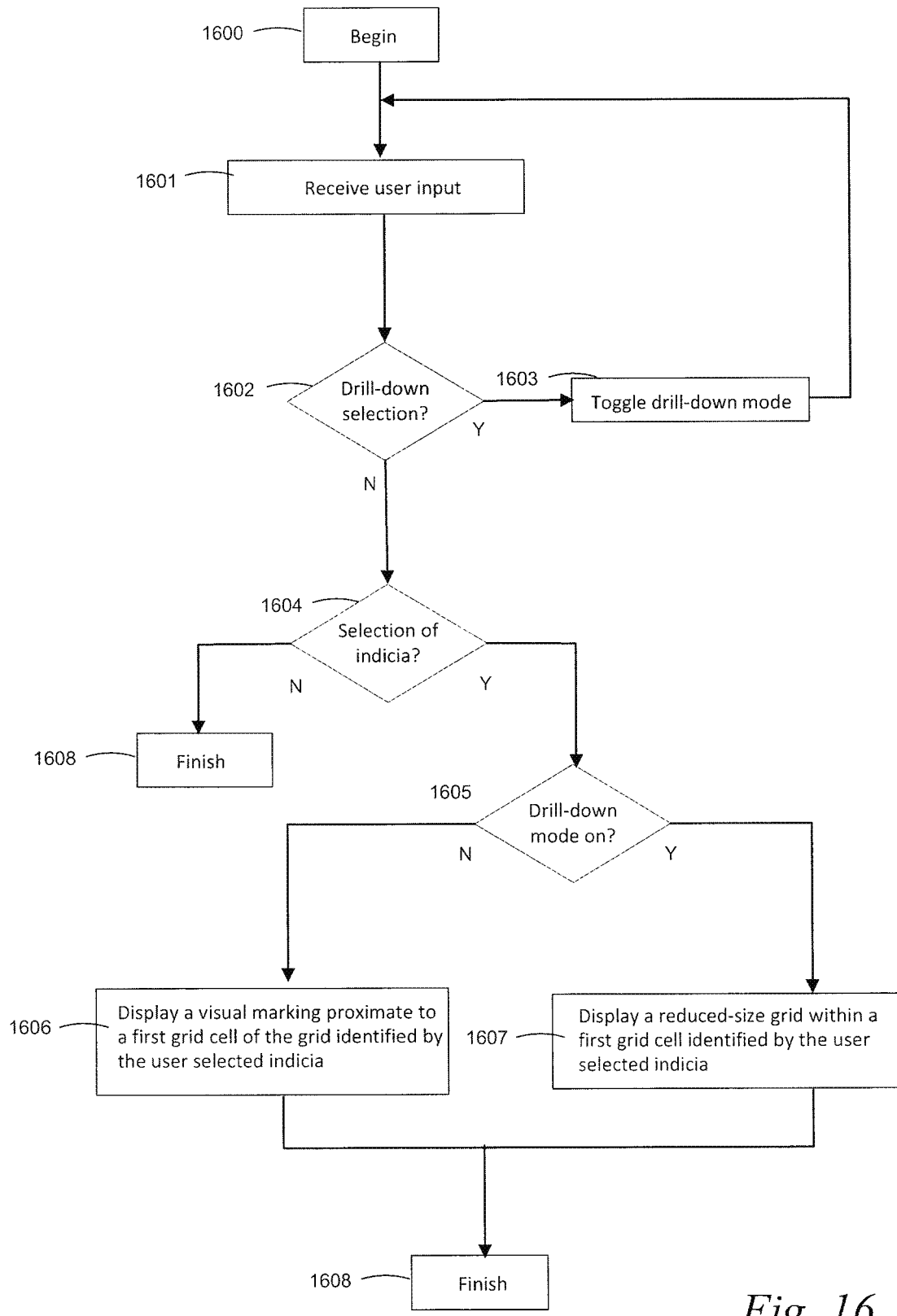
FIG. 16 illustrates a flowchart of a method performed by a client terminal or server, according to an example embodiment.

FIG. 16 is a flow chart illustrating a method performed by a terminal or a server, such as terminal 102 or server 503, in accordance with an example embodiment. The method of FIG. 16 may occur after the steps in the method of FIG. 4, or after the steps in the method of FIG. 6. The method of FIG. 16 may be performed by any of the modules, logic, or components described herein.

The method beings at step 1600, and in step 1601, the terminal or server detects user input. If the user input is a toggle selection of drill-down mode (step 1602, Yes) the terminal or server can toggle the drill-down mode on or off as appropriate (step 1603), and the flow returns to step 1601. If the user input is not a toggle selection of drill-down mode (step 1602, No), but is instead a user selection of grid indicia (step 1604, Yes), then the flow proceeds to step 1605, if the drill-down mode is currently activated (step 1605, Yes), then in step 1606 the terminal or server causes the terminal display to display a reduced-size grid within a first grid cell identified by the user selected grid indicia (step 1607; see FIG. 15), and the method ends (step 1608). If the drill-down mode is not currently activated (step 1605, No), then in step 1607 the terminal or server displays a visual marking proximate to a first grid cell of the grid identified by the user selected grid indicia (step 1606, e.g. see FIG. 7), and the method ends (step 1608).

According to another exemplary embodiment, the grid control module 102b of the terminal 102 determines a display resolution and/or display size of the display of the client terminal 102, and grid control module 102b adjusts the lines of the grid, based on the display resolution and/or display size of the display of the terminal. Instead or in addition, at the server side, the grid control module 503b of the server 503 determines a display resolution and/or display size of the display of the terminal 502, and the grid control module 503b adjusts the lines of the grid displayed by the display of the terminal, based on the display resolution and/or display size of the display of the terminal.

For example, it is common for the displays of different devices (workstations, terminals, mobile devices, etc.) to have different display resolutions and/or display sizes, in terms of the inherent configuration of the display, as well as the display resolution settings selected by the user of the device. As a result, the webpage displayed on the displays of each device may appear differently (e.g. larger, smaller, stretched, compressed, etc.). However, in order to assist users to navigate a webpage, the grid must be properly scaled on each device, such that a particular grid indicia (and corresponding cell) describes the same part of the webpage, regardless of the user's device, device display resolution or device display size. That is, the grid indicia E6 should refer to the same content of the webpage, regardless of the user's device, device display resolution or device display size.

Thus, according to this exemplary embodiment, the grid control module 102b of the terminal 102 (or the grid control module 503b of the server 503) determines a display resolution and/or display size of the display of the terminal. For example, the grid control module of the terminal or server may access configuration or capabilities information of the terminal, in order to determine the display resolution and/or display size of the terminal's display. In addition, the grid control module of the terminal or server may access user selected settings for display resolution (since many users select a display resolution via their device's Operating System, for example), in order to determine a display resolution and/or display size of the display of the terminal. Thereafter, the grid control module 102b of the terminal 102 (or the grid control module 503b of the server 503) adjusts the size and scale of the grid, in order to compensate for the different resolutions and achieve a standard grid-to-pixel ratio.

Figure 17:
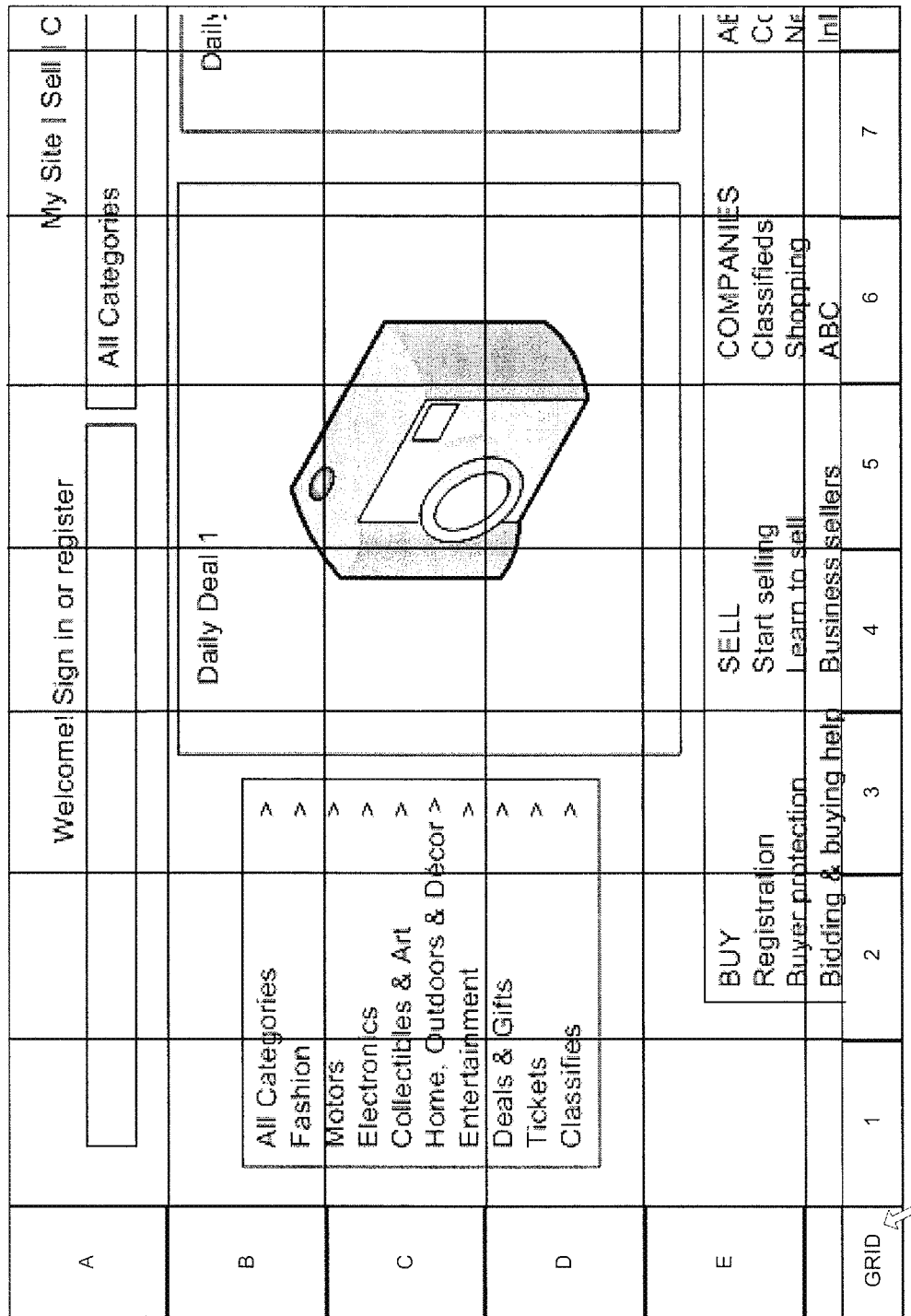
FIG. 17 illustrates an example portion of a user interface screen of a browser, displayed on a display of a client terminal via a browser application, wherein a grid is adjusted based on a display resolution of a display screen, according to an example embodiment.

As one example, the webpage of FIG. 3 may be displayed at a first resolution on a terminal display of a first size, and the grid is overlaid over the content of the webpage at a specific grid-to-pixel ratio. FIG. 17 illustrates the same webpage being displayed on a terminal display of a different display resolution and/or different display size. The grid control module of the corresponding terminal or server may determine that the display resolution or display size is different (e.g. the display in FIG. 17 has fewer pixels to display the same webpage). As a result, grid control module 102b of the terminal 102 (or the grid control module 503b of the server 503) adjusts the size of the grid, the distance between the lines of the grid, the size of the indicia, and so forth, to achieve the same grid-to-pixel ratio as seen in FIG. 3. Thus, the grid cell corresponding to grid indicia E4 indicates the same content of the webpage, in both FIG. 3 and FIG. 17.

According to another aspect, the HTML code of a webpage hosted by the server 503 may include a tag or data indicating a size of each grid column and grid row (e.g. the number of pixels corresponding to each grid column and row) of any grid to be superimposed over the webpage by the grid control module. The grid control module of the terminal or server may access this information, in order to generate the grid to be superimposed of the webpage displayed on the terminal display.

Figure 18:
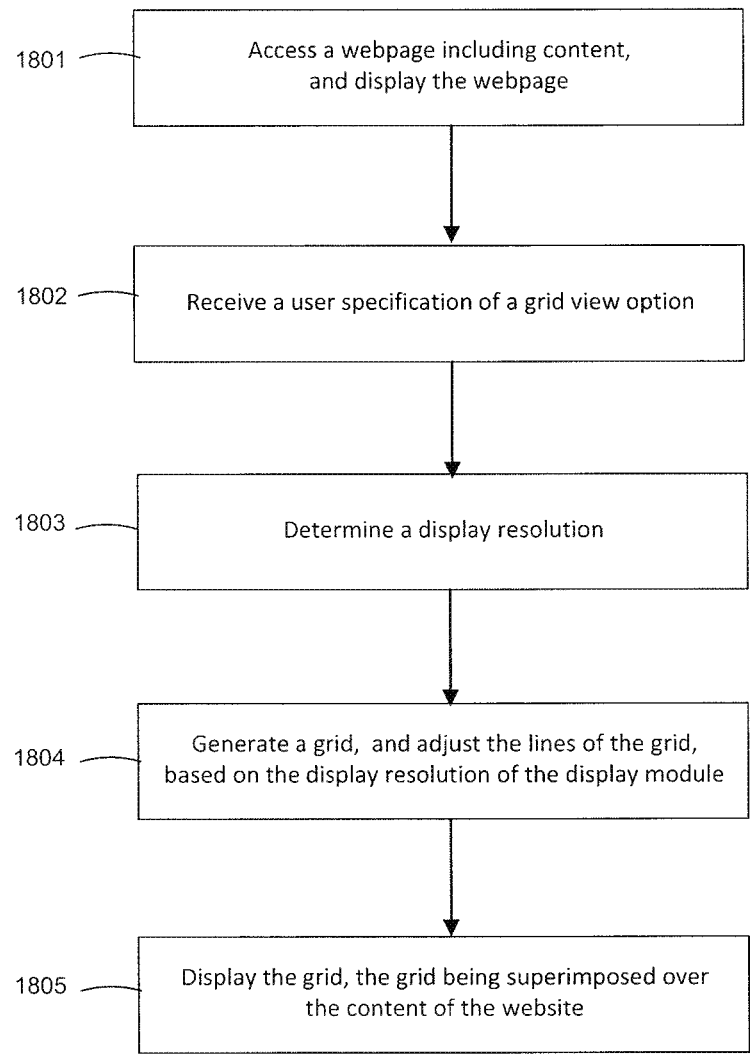
FIG. 18 illustrates a flowchart of a method performed by a client terminal or server, according to an example embodiment.

FIG. 18 is a flow chart illustrating a method performed by a client terminal or server, such as client terminal 102 (or server 503). The method of FIG. 18 may be performed by any of the modules, logic, or components described herein.

In step 1801, the terminal accesses a webpage including content, and displays the webpage on a display module of the client terminal. An example of a webpage displayed on a display of a client terminal is illustrated in FIG. 2. Then, in step 1802, the terminal receives a user specification of a grid view option. For example, the terminal may detect user selection of the grid view button 202 illustrated in FIG. 2, which is displayed by the browser application of the terminal on the display of the terminal. In step 1803, the terminal determines a display resolution of the display of the terminal, and in step 1804, the terminal generates a grid, and adjusts the lines of the grid based on the display resolution of the display of the terminal. In step 1805, the terminal displays the grid on the display module, the grid being superimposed over the content of the webpage, as illustrated in FIG. 3 and FIG. 17.

Modules, Components and Logic

Certain embodiments are described herein as including logic or a number of components, modules, or mechanisms. Modules may constitute either software modules (e.g., code embodied (1) on a non transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors ma be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 19:
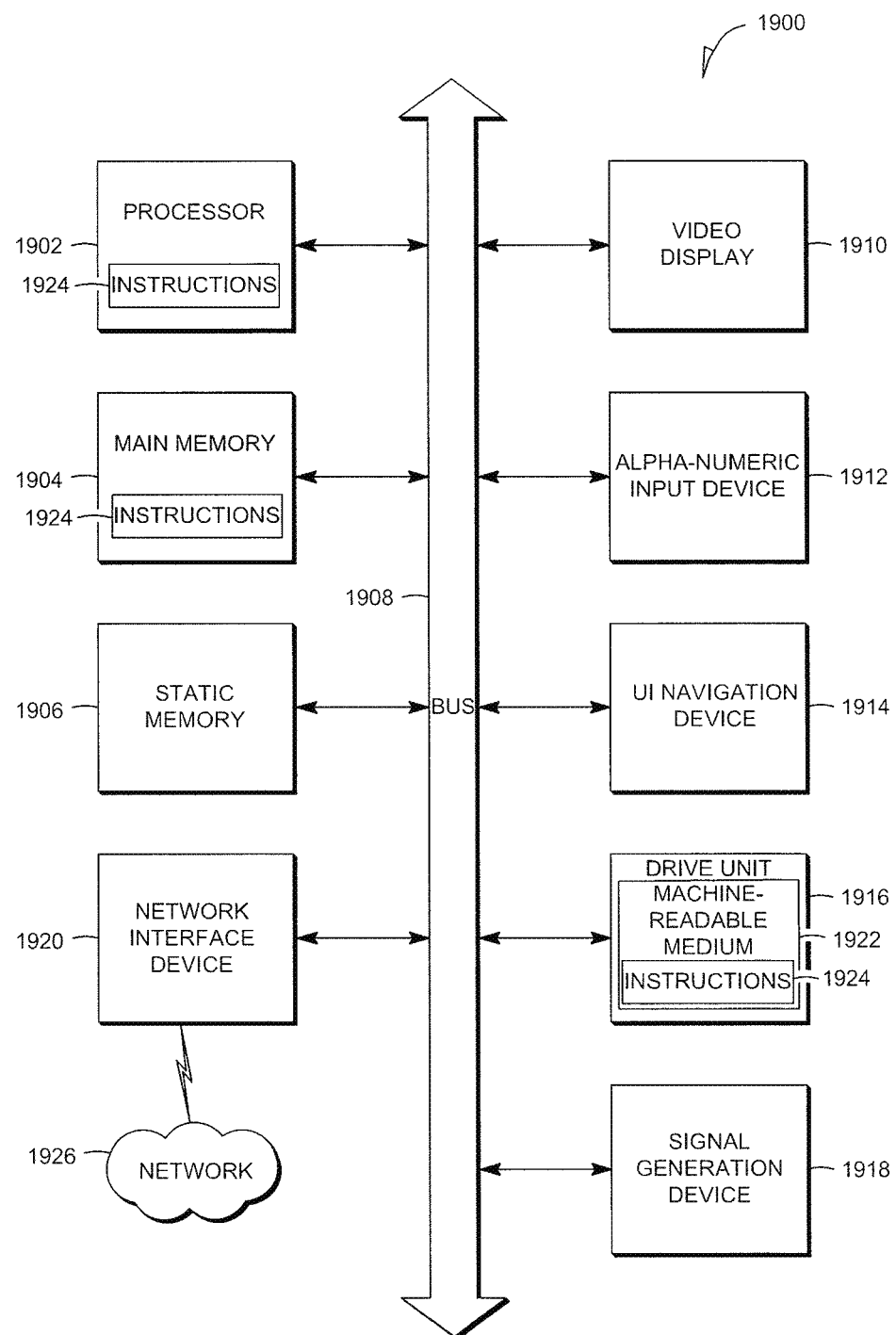
FIG. 19 is a block diagram of machine in the example form of a computer system within which a set instructions, for causing the machine to perform any one or more of the methodologies discussed herein, may be executed.

FIG. 19 is a block diagram of machine in the example form of a computer system 1900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU) or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a user interface (UI) navigation device 1914 (e.g., a mouse), a disk drive unit 1916, a signal generation device 1918 (e.g., a speaker) and a network interface device 1920.

Machine-Readable Medium

The disk drive unit 1916 includes a machine-readable medium 1922 on which is stored one or more sets of instructions and data structures (e.g., software) 1924 embodying or utilized by any one or more of the methodologies or functions described herein. The instructions 1924 may also reside, completely or at least partially, within the main memory 1904 and/or within the processor 1902 during execution thereof by the computer system 1900, the main memory 1904 and the processor 1902 also constituting machine-readable media.

While the machine-readable medium 1922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1924 may further be transmitted or received over a communications network 1926 using a transmission medium. The instructions 1924 may be transmitted using the network interface device 1920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   a processor; and
   a memory coupled to the processor and storing instructions that, when executed by the processor, cause the system to perform operations comprising:
   causing the display of content via a user interface of a client terminal in communication with the system;
   causing the display of an overlay via the user interface of the client terminal, the overlay being superimposed over the content, wherein the overlay includes a plurality of horizontal lines and a plurality of vertical lines that define a plurality of cells of the overlay;

receiving, via the user interface, a selection of a settings option for the overlay; and modifying a first displayed distance between each of the plurality of horizontal lines and a second displayed distance between each of the plurality of vertical lines of the overlay to adjust a displayed size of each cell of the plurality of cells within the overlay based at least in part on the settings option.

2. The system of claim 1, wherein the overlay comprises a horizontal axis indicia and a vertical axis indicia.

3. The system of claim 1, wherein when the displayed content changes, the overlay is configured to persist is place over the displayed content.

4. The system of claim 1, wherein the overlay includes the plurality of horizontal lines connected to a vertical axis and the plurality of vertical lines connected to a horizontal axis.

5. The system of claim 4, wherein the horizontal and the vertical axes including plural alphanumeric indicia that each identify a cell of the overlay bounded by at least two of the lines.

6. The method of claim 5, wherein each of the cells comprises transparent indicia selected from the alphanumeric indicia.

7. The system of claim 1, wherein the overlay includes the plurality of horizontal lines connected to a vertical axis and the plurality of vertical lines connected to a horizontal axis, the horizontal and the vertical axes including plural alphanumeric indicia that each identify a cell of the overlay bounded by at least two of the lines; and wherein causing the display of the overlay comprises receiving a selection of one of the alphanumeric indicia and in response to the selection, displaying only the cell corresponding to the selected alphanumeric indicia.

8. The system of claim 1, wherein causing the display of the overlay includes:

receiving the selection of the settings option for the overlay via the user interface; and in response to the selection of the settings option, modifying the first displayed distance between each of the plurality of horizontal lines of the plurality of cells in the overlay, and the second displayed distance between each of the plurality of vertical lines of the plurality of cells in the overlay, to adjust the displayed size of each of the plurality of cells within the overlay to a uniform size.

9. The system of claim 1, wherein causing the display of the overlay includes:

receiving a selection of a transparency settings option for the overlay via the user interface; and in response to the selection of the transparency setting, modifying one or more of: a transparency factor of a selected cell, a color of a selected cell, a width of the horizontal lines, a width of the vertical lines, a style of the horizontal lines, and a style of the vertical lines.

10. A method comprising:

causing the display of content via a user interface of a client terminal in communication with the system;

causing the display of an overlay via the user interface of the client terminal, the overlay being superimposed over the content, wherein the overlay includes a plurality of horizontal lines and a plurality of vertical lines that define a plurality of cells of the overlay;

receiving, via the user interface, a selection of a settings option for the overlay; and modifying a first displayed distance between each of the plurality of horizontal lines and a second displayed distance between each of the plurality of vertical lines of the overlay to adjust a displayed size of each cell of the plurality of cells within the overlay based at least in part on the settings option.

11. The method of claim 10, wherein when the displayed content changes, the overlay is configured to persist is place over the displayed content.

12. The method of claim 10, wherein the overlay includes the plurality of horizontal lines connected to a vertical axis and the plurality of vertical lines connected to a horizontal axis.

13. The method of claim 12, wherein the horizontal and the vertical axes including plural alphanumeric indicia that each identify a cell of the overlay bounded by at least two of the lines.

14. The method of claim 13, wherein each of the cells comprises transparent indicia selected from the alphanumeric indicia.

15. The method of claim 10, wherein the overlay includes the plurality of horizontal lines connected to a vertical axis and the plurality of vertical lines connected to a horizontal axis, the horizontal and the vertical axes including plural alphanumeric indicia that each identify a cell of the overlay bounded by at least two of the lines; and wherein causing the display of the overlay comprises receiving a selection of one of the alphanumeric indicia and in response to the selection, displaying only the cell corresponding to the selected alphanumeric indicia.

16. A non-transitory computer-readable medium storing instructions that, when executed by a computing system, cause the computing system to perform operations comprising:

causing the display of content via a user interface of a client terminal in communication with the system;

causing the display of an overlay via the user interface of the client terminal, the overlay being superimposed over the content, wherein the overlay includes a plurality of horizontal lines and a plurality of vertical lines that define a plurality of cells of the overlay;

receiving, via the user interface, a selection of a settings option for the overlay; and modifying a first displayed distance between each of the plurality of horizontal lines and a second displayed distance between each of the plurality of vertical lines of the overlay to adjust a displayed size of each cell of the plurality of cells within the overlay based at least in part on the settings option.

17. The system of claim 16, wherein when the displayed content changes, the overlay is configured to persist is place over the displayed content.

18. The system of claim 16, wherein the overlay includes the plurality of horizontal lines connected to a vertical axis and the plurality of vertical lines connected to a horizontal axis.

19. The system of claim 18, wherein the horizontal and the vertical axes including plural alphanumeric indicia that each identify a cell of the overlay bounded by at least two of the lines.

20. The system of claim 16 wherein the overlay includes the plurality of horizontal lines connected to a vertical axis and the plurality of vertical lines connected to a horizontal axis, the horizontal and the vertical axes including plural alphanumeric indicia that each identify a cell of the overlay bounded by at least two of the lines; and wherein causing the display of the overlay comprises receiving a selection of one of the alphanumeric indicia and in response to the selection, displaying only the cell corresponding to the selected alphanumeric indicia.

\* \* \* \* \*